US012658068B2

(12) United States Patent
Kirkman

(10) Patent No.: US 12,658,068 B2
(45) Date of Patent: Jun. 16, 2026

(54) MOTION PLATFORM

(71) Applicant: Anthony Best Dynamics Limited, Wiltshire (GB)

(72) Inventor: David Kirkman, Newbury (GB)

(73) Assignee: Kirkman Technologies Ltd., Newbury (GB)

( * ) Notice: Subject to any disclaimer, the term of this patent is extended or adjusted under 35 U.S.C. 154(b) by 1179 days.

(21) Appl. No.: 17/629,184

(22) PCT Filed: Jul. 23, 2020

(86) PCT No.: PCT/GB2020/051763
§ 371 (c)(1),
(2) Date: Jan. 21, 2022

(87) PCT Pub. No.: WO2021/019213
PCT Pub. Date: Feb. 4, 2021

(65) Prior Publication Data
US 2022/0254269 A1 Aug. 11, 2022

(30) Foreign Application Priority Data
Jul. 26, 2019 (GB) ..................................... 1910726

(51) Int. Cl.
*G09B 9/14* (2006.01)
*A63G 31/16* (2006.01)

(52) U.S. Cl.
CPC ............... *G09B 9/14* (2013.01); *A63G 31/16* (2013.01)

(58) Field of Classification Search
CPC .......... A63G 31/16; G09B 9/14; G09B 19/16; G09B 19/165; G09B 9/28; G09B 9/08
See application file for complete search history.

(56) References Cited

U.S. PATENT DOCUMENTS 4,753,596 A * 6/1988 Hart ......................... G09B 9/14
434/58
4,978,299 A * 12/1990 Denne ..................... G09B 9/14
434/58
(Continued)

FOREIGN PATENT DOCUMENTS

CN 1289995 A 4/2001
CN 1751329 A 3/2006
(Continued)

OTHER PUBLICATIONS

JP 2009243631 A (Year: 2009).*
(Continued)

*Primary Examiner* — John E Simms, Jr.
*Assistant Examiner* — Amir A Klayman
(74) *Attorney, Agent, or Firm* — Withrow + Terranova, PLLC; Vincent K. Gustafson

(57) ABSTRACT

A motion platform comprises a base portion and an occupant carrier portion. The occupant carrier portion is linearly moveable along, and rotationally moveable about, first, second, and third orthogonal axes. The base portion comprises first, second, and third control pillars each extend along the third axis with a predetermined height. The control pillars are linearly moveable in a plane defined by the first and second axes and are mechanically constrained to move only in that plane. The occupant carrier portion comprises first, second, and third guide portions that are pivotally connected to the first, second, and third control pillars respectively by a respective coupling member. Each of the guide portions is angled with respect to the plane defined by the first and second axes such that they are not parallel to the plane. The guide portions are also angled with respect to each other such that they are not parallel with each other.

13 Claims, 20 Drawing Sheets

(56) References Cited

U.S. PATENT DOCUMENTS

| | | | | |
|---|---|---|---|---|
| 5,018,973 | A * | 5/1991 | Alet | G09B 9/04 434/58 |
| 5,656,905 | A * | 8/1997 | Tsai | B25J 17/0266 901/41 |
| 5,669,773 | A | 9/1997 | Gluck | |
| 5,782,639 | A * | 7/1998 | Beal | A63F 13/212 472/130 |
| 6,059,703 | A * | 5/2000 | Heisel | B25J 17/0266 409/145 |
| 6,077,078 | A * | 6/2000 | Alet | F16M 11/18 472/130 |
| 6,110,049 | A | 8/2000 | Wilkens | |
| 6,431,872 | B1 * | 8/2002 | Shiraishi | G09B 9/05 434/69 |
| 6,974,297 | B2 * | 12/2005 | Brogardh | B25J 9/0042 901/29 |
| 8,424,411 | B2 * | 4/2013 | Long | B25J 17/0216 74/490.05 |
| 9,289,693 | B1 | 3/2016 | Morris et al. | |
| 9,466,223 | B2 * | 10/2016 | Stevens | G09B 9/04 |
| 10,056,004 | B2 * | 8/2018 | Warmerdam | G09B 9/12 |
| 10,056,007 | B2 | 8/2018 | Kirkman | |
| 10,668,395 | B1 * | 6/2020 | Lee | A63G 31/02 |
| 10,940,588 | B2 * | 3/2021 | Ludban | B25J 9/0009 |
| 2003/0219701 | A1 * | 11/2003 | Zeier | G09B 9/14 434/33 |
| 2005/0012404 | A1 * | 1/2005 | Onishi | H02K 9/197 310/12.29 |
| 2005/0129495 | A1 * | 6/2005 | Brogardh | B25J 9/0072 414/680 |
| 2005/0277092 | A1 * | 12/2005 | Hwang | G09B 19/16 434/58 |
| 2008/0268404 | A1 * | 10/2008 | Burt | G09B 19/12 434/55 |
| 2009/0246741 | A1 * | 10/2009 | Soodeen | G09B 9/08 434/30 |
| 2010/0122602 | A1 * | 5/2010 | Marcroft | B25J 17/0216 901/18 |
| 2010/0216097 | A1 * | 8/2010 | Romagnoli | G09B 9/02 434/62 |
| 2012/0282588 | A1 | 11/2012 | Stevens et al. | |
| 2012/0301853 | A1 * | 11/2012 | Garvis | G09B 9/14 434/58 |
| 2014/0311271 | A1 * | 10/2014 | Cao | B25J 9/0036 901/19 |
| 2015/0308921 | A1 | 10/2015 | Warmerdam et al. | |
| 2016/0379512 | A1 | 12/2016 | Kirkman | |
| 2018/0096622 | A1 | 4/2018 | Glover et al. | |
| 2019/0024842 | A1 | 1/2019 | Durand et al. | |

FOREIGN PATENT DOCUMENTS

| | | | | |
|---|---|---|---|---|
| CN | 101339701 A | 1/2009 | | |
| CN | 102083507 A | 6/2011 | | |
| DE | 102008032231 A1 | 1/2009 | | |
| EP | 3133575 A | 2/2017 | | |
| EP | 3739558 A1 | 11/2020 | | |
| GB | 2474279 A * | 4/2011 | | G09B 9/14 |
| GB | 2509053 A | 6/2014 | | |
| JP | 2009243631 A * | 10/2009 | | |
| JP | 2011021681 A1 | 2/2011 | | |
| JP | 5477737 B2 * | 4/2014 | | |
| JP | 2016502686 A | 1/2016 | | |
| KR | 20150134714 A * | 12/2015 | | G09B 9/02 |
| WO | 9741545 A1 | 11/1997 | | |
| WO | WO-02096605 A1 * | 12/2002 | | B25J 17/0266 |
| WO | 2014087172 A1 | 6/2014 | | |
| WO | WO-2020249262 A1 * | 12/2020 | | A63G 31/16 |

OTHER PUBLICATIONS

JP 5477737 B2 (Year: 2014).*
KR 20150134714 A (Year: 2015).*
International Search Report (Form PCT/ISA/210) for International Application No. PCT/GB2020/051763 mailed Oct. 16, 2020, 3 pages.
Written Opinion (Form PCT/ISA/237) for International Application No. PCT/GB2020/051763 mailed Oct. 16, 2020, 6 pages.
Search Report under Section 17(5) for United Kingdom Patent Application No. GB1910726.7 mailed Jan. 27, 2020, 4 pages.
First Office Action for Chinese Patent Application No. 202080053268. 5, mailed Sep. 1, 2023, 14 pages.
Notice of Reasons for Refusal for Japanese Patent Application No. 2022-504017, mailed May 14, 2024, 6 pages.
Examination Report for European Patent Application No. 20751228. 6, mailed Jun. 4, 2025, 6 pages.

* cited by examiner

38

34

36

28, 30, 32

402

404    408

406

402

404    408

406

MOTION PLATFORM

This application is a 35 U.S.C. § 371 national phase filing of International Application No. PCT/GB2020/051763, filed on Jul. 23, 2020, and claims the benefit of United Kingdom Patent Application No. 1910726.7, filed on Jul. 26, 2019, wherein the entire contents of the foregoing applications are hereby incorporated by reference herein.

TECHNICAL FIELD

This invention relates to a motion platform, particular to a motion platform suitable for simulating motions, e.g. in which a high frequency response is desired such as automotive, motorsport and aerospace environments.

BACKGROUND ART

A motion platform may provide for six degrees of freedom, allowing an occupant to be subjected to a range of motions that provide a realistic sensation of being in the environment under simulation. For example, a motion platform may provide an occupant with an accurate sensation of being in a motor racing car, e.g. a Formula One™ car. The six degrees of freedom correspond to linear movements in the surge, sway, and heave directions (i.e. along the x-, y-, and z-axes respectively), and rotational motions in the roll, pitch, and yaw directions (i.e. about the x-, y-, and z-axes respectively).

A Stewart platform or hexapod uses a platform connected to a base unit by six telescopic struts or actuators. The apparatus may be very large and heavy. Due to the large range of movement provided by the struts, the apparatus may be very tall. Typically, there is a requirement for a large volume of 'dead space' under the platform. The struts must be relatively powerful with this type of configuration and as such it is difficult to provide a high bandwidth for horizontal and vertical motion. This type of simulator maybe useful for aircraft of the type in which high horizontal forces and accelerations do not need to be simulated, however such a simulator is not universally adequate as some real vehicles such as motor racing cars can be subject to very high forces in both the horizontal (when braking, accelerating or cornering) and vertical (ride handling) directions.

One platform known in the art per se is the 'Williams' platform, as described in WO 2014/087172 A1. While the Williams platform helps to alleviate some of the limitations of a Stewart platform, the Applicant has appreciated that there is potential for further improvements.

Due to the nature of the angled platform between the carriages in the Williams platform, there is both poor authority (i.e. the ability to accurately control the motion platform) and very low range of travel in the surge axis. Whilst it is possible to increase the angle of the "V" in the platform to increase authority, this is to the detriment of the overall surge travel. Having a larger range of surge travel would be desirable, however conventional arrangements known in the art per se are somewhat limited in this regard.

A limited degree of surge travel may create a problem during sustained brake cueing which can lead to miscuing the occupant with a perception of brake fade as the travel runs out before it has finished the cue. It may also be impractical to extend the range of surge motion with conventional designs due to the overhang hitting the floor.

Furthermore, when the platform is at the extremities of either end of surge the centre of gravity is substantially different from the default 'mid' position (i.e. the position in which the gas struts are tuned to take most of the static mass) as it is inherently unbalanced. This causes the gas struts, which are designed to hold the platform's static mass in the default mid position, to be sub-optimal. This is generally very difficult to control as holding the position typically creates a peak current demand in the motors which can lead to system instability.

Conventional motion platforms also require a large physical footprint, particularly in the sway direction (i.e. along they axis). The footprint is important when considering scaling the platform with limited space available.

Other examples of prior art show multi-stage systems in which, generally, one stage will do yaw, surge and sway and another stage will do heave, pitch and roll or perhaps multi stage for each axis. However, multi-stage systems are problematic because they negatively impact the high frequency response of the motion platform. Those skilled in the art will appreciate that the frequency response of the motion platform (i.e. its ability to make high speed movements such as to simulate a shock motion associated with hitting a bump in a road) is tied to the mechanical stiffness, the moving mass of the motion platform, and to the actuators used to impart motion. By 'stacking' layers of actuators, the result is typically a very heavy system, where the excess weight has a significant negative effect on the frequency response of the motion platform, particularly impacting the high frequency response.

The Applicant has appreciated that there is a need for a highly capable single stage motion platform as this would allow for a heavier payload and greater performance.

SUMMARY OF THE INVENTION

In accordance with a first aspect, the present invention provides a motion platform comprising a base portion and an occupant carrier portion, said occupant carrier portion being linearly moveable along first, second, and third orthogonal axes, and rotationally moveable about said first, second, and third axes, wherein:

the base portion comprises first, second, and third control pillars each extending substantially along the third axis, each of said control pillars being linearly moveable in a plane defined by the first and second axes, wherein the control pillars are mechanically constrained such that they move only in said plane;

the occupant carrier portion comprises first, second, and third guide portions, said first, second, and third guide portions being pivotally connected to the first, second, and third control pillars respectively by a respective coupling member;

the first, second, and third guide portions are each angled with respect to the plane defined by the first and second axes such that said guide portions are not parallel to said plane; and the first, second, and third guide portions are angled with respect to each other such that each guide portion is not parallel with the other guide portions;

said motion platform being arranged such that, in use, the first, second, and third control pillars each have a respective height of a predetermined value along the third axis.

Thus it will be appreciated by those skilled in the art that embodiments of the present invention provide an improved motion platform having six degrees of freedom, where all motions are imparted through the movement of the control pillars, which are constrained to move only in the plane of the base, e.g. in the x-y plane. The relative movements of the three control pillars in the plane of the base translate to surge, sway, heave, roll, pitch, and yaw motions as required. The pivotal connections between the control pillars and the angled guide portions allows movements of the control pillars in the x-y plane to translate to motion, e.g. in the z-axis direction. Thus the occupant carrier portion is mechanically constrained in all six degrees of freedom by the control pillars and guide portions.

The control pillar-based design is highly advantageous because it does not rely on a push/pull rod to impart motion and therefore friction and backlash in the system is significantly reduced compared to prior art arrangements known in the art per se. The motion platform of the present invention may be readily incorporated in a motion simulator with six degrees of freedom where high travel, velocity and frequency bandwidth in all axes is required.

A motion platform in accordance with the principles of the present invention may require approximately 60% of the space in the x axis compared to a conventional motion platform. This efficient use of space also advantageously allows for scaling of the motion platform. For example, compared to prior art motion platforms, the motion platform of the present invention may be substantially extended in the x direction compared with the limitations imposed by the prior art arrangements outlined previously.

It will be appreciated that the term 'predetermined value' as used herein with respect of the respective heights of the control pillars means that the control pillars are of a construction such that, during operation, their respective heights are non-variable, i.e. the distance between the 'bottom' (the end connected to the base portion) and the 'top' (the end pivotally connected to the appropriate guide portion) of each control pillar is constant. A non-variable height may help to achieve greater stiffness of the system, which as outlined above influences the frequency response of the motion platform.

While the control pillars may, in some embodiments, comprise a cylindrical post, other shapes are envisaged—for example the control pillars could, in other embodiments, be cuboid, pyramidal, conic, or could be irregularly shaped.

The control pillars may, in some embodiments, be constructed from a composite material. The pillars may be constructed similarly to a 'nose cone' used in a Formula One™ car.

In some embodiments the respective heights of the first, second, and third control pillars are substantially the same. However in some applications it may be desirable to provide the motion platform with a permanent 'rake', e.g. to mirror that of a racing car and thus, in at least some embodiments the respective heights of at least two of the first, second, and third control pillars are different.

The heights of the pillars may, in some embodiments, be fixed to the respective predetermined value by having the components themselves be of a fixed height, i.e. in some embodiments there exists no means for varying the heights of the control pillars. For example, the control pillars may each have a post-like construction as outlined above. However, in some embodiments, the height of at least one of the control pillars may be adjusted when the motion platform is not in use, wherein the height of said at least one control pillar is locked to the respective predetermined value when the motion platform is in use. For example, in some embodiments one or more of the control pillars may comprise a threaded bolt member, wherein a portion of the coupling member is connected to the threaded bolt member. In such embodiments, the height of the control pillar may be adjusted by loosening or tightening the bolt member when the motion platform is not in operation.

As outlined above, the control pillars are arranged to move in a plane defined by the first and second axes. The base in which the control pillars move may be any suitable shape, however in at least some embodiments the base portion is substantially planar. In a preferred set of embodiments, a plane of the base portion is parallel to the plane in which the first, second, and third control pillars move, and is preferably coplanar with the plane in which the first, second, and third control pillars move. A planar base portion allows for relatively simple control of the control pillars in the plane.

In a set of such embodiments, the base portion comprises an X-Y table portion, wherein the X-Y table portion is arranged to provide independent in-plane movement of the first, second, and third control pillars along a respective first direction and a respective second direction, said first and second directions defining a plane normal to the third axis. The first and second directions are preferably orthogonal to one another (i.e. perpendicular). The major plane of the X-Y table (i.e. the defined by the first and second directions) is parallel with—and is preferably coplanar with—the plane defined by the first and second axes. While the in-plane motion of the control pillars along the first and second directions could be angled with respect to the first and second axes, the first direction is preferably along the first axis, and the second direction is preferably along the second axis. Having the X-Y table portion motions along the first and second axis directions makes control of the motion platformer simpler.

In some such embodiments, the X-Y table portion comprises an X-Y table comprising a first slide rail and a second slide rail, said slide rails being slideably moveable relative to one another, wherein at least one control pillar is mounted on said X-Y table such that a sliding movement of the first slide rail moves the at least one control pillar along the first direction and such that a sliding movement of the second slide rail moves the at least one control pillar along the second direction.

A single X-Y table could provide motion for each of the control pillars, however in some embodiments, the X-Y table portion comprises first, second, and third X-Y tables, each of said X-Y tables comprising respective first and second slide rails, said slide rails being slideably moveable relative to one another, wherein the first, second, and third control pillars are mounted on the first, second, and third X-Y tables respectively such that a sliding movement of the first slide rail moves the corresponding control pillar along the first direction and such that a sliding movement of the second slide rail moves the corresponding control pillar along the second direction. Thus, in accordance with such embodiments, each control pillar may be mounted on a separate X-Y table, where each X-Y table moves a control pillar in-plane.

While the elements that provide in-plane motion of the control pillars could be co-planar, in some embodiments each X-Y table may comprise a first carriage and a second carriage, said first and second carriages being arranged in a stack. Generally, the top carriage (i.e. the upper carriage in the stack) may comprise the relevant control pillar. It will be appreciated that a 'stack' arrangement means that the first carriage is mounted on top of the second carriage, or that the second carriage is mounted on top of the first carriage. Splitting these into separate carriages, mounted one on top of another, may keep the moving mass down when used with a large motion envelope. The carriages may be constructed from a carbon composite material in order to keep the mass down while retaining relatively high stiffness, which is advantageous for the reasons discussed previously. Thus there may be 'first' and 'second' carriages for each X-Y table.

The first carriage may comprise the control pillar and one or more bearings that move along the first direction with respect to the second carriage, and a motor (e.g. a linear motor as described elsewhere herein) for driving said motion of the first carriage along the first direction. The bearings on the first carriage may move along bearing rails on the second carriage, the bearing rails being aligned along the first direction. The second carriage may comprise one or more bearings that move along the second direction with respect to a base of the X-Y table, and a motor (e.g. a linear motor as described elsewhere herein) for driving said motion of the second carriage (and thus the first carriage mounted thereon) along the second direction. The bearings on the second carriage may move along bearing rails on the base, these bearing rails being aligned along the second direction.

Thus, in some embodiments, each X-Y table respectively comprises a first carriage and a second carriage, said first and second carriages being arranged in a stack, wherein:

the first carriage comprises the respective control pillar and one or more bearings that move along the first direction with respect to the second carriage, and a motor arranged to drive said motion of the first carriage along the first direction;

the second carriage comprises one or more bearings that move along the second direction with respect to a base of the X-Y table, and a motor arranged to drive motion of the second carriage along the second direction;

the second carriage further comprises one or more bearing rails aligned along the first direction, wherein the bearings of the first carriage engage with the one or more bearing rails of the second carriage; and the base of the X-Y table comprises one or more further bearing rails aligned along the second direction, wherein the bearings of the second carriage engage with the one or more bearing rails of the base.

It will of course be appreciated that which of the 'first' and 'second' carriages are on the top and bottom of the stack can be reversed, such that the top carriage moves along the second direction, and the bottom carriage moves along the first direction, as appropriate. In such arrangements, the second carriage may comprise the relevant control pillar.

The X-Y tables may provide for linear motion in each of the first and second directions, e.g. using one or more linear motors.

In some embodiments, the X-Y tables may comprise one or more ironless linear motors. Those skilled in the art will appreciate that an ironless linear motor does not include an iron core, and instead generally employs a primary part (akin to the stator of a rotary motor) constructed from a plurality of windings wrapped around laminated steel, where these are typically embedded in epoxy resin. Unlike iron core motors, an ironless motor avoids there being any attractive forces between the primary and secondary parts that can cause unwanted cogging of the motor, improving the ability of the motor to travel at both relatively high and low speeds with excellent positioning accuracy.

As outlined above, in some embodiments the motors for the in-plane motion may be stacked on top of one another. One type of linear motor, known in the art per se, that could be used for one of both of the stacked carriages uses 'U-channel' magnets. However, due to the weight of these types of motor, stacking them may be undesirable. In some embodiments, one or more of the X-Y tables employ a linear shaft motor comprising a plurality of magnets arranged in a cylindrical shaft, and a forcer comprising an electromagnet coil that surrounds the circumference of said shaft along a portion of the length of the shaft. In other words, a shaft containing a stack of 'disk-shaped' magnets passes through the electromagnet coil, located within the forcer of the motor (i.e. the part that moves). Generally, the orientation of the magnets alternates between adjacent magnets, such that the poles of the magnets are, e.g.: N-S; S-N; N-S; etc.

Such an arrangement may result in the entire magnetic field being used by the motor coil. Additionally, these 'cylinder-channel' (or 'tubular') devices may have a significantly lower mass when compared to a U-channel device of similar performance, and may also exhibit a lower thermal build up, which is particularly desirable. Examples of such motors, suitable for some applications, may be commercially available from e.g. Nippon Pulse America, Inc.

In an alternative set of embodiments, the base portion comprises a substantially circular support rail, said support rail defining a plane normal to the third axis, wherein the first, second, and third control pillars are connected to a plurality of radially moveable actuators, each connection between the control pillars and the respective radially moveable actuators being provided by a respective tension member, wherein the radially moveable actuators are arranged to move around the circumference of the circular support rail.

When simulating the motion of a car going quickly into a tight corner, a larger yaw rotation may be needed to cue the sensation of the turn than is needed to cue the sensation of coming out of the turn. This may be problematic with conventional motion platforms known in the art per se, because the motion platform is typically required to return to centre (i.e. its default or null position, corresponding to zero yaw rotation) to enable further yaw movements (e.g. for the next turn on a track). Returning the motion platform to centre can cue an incorrect sensation for the occupant. Conventionally in a platform that is yaw limited, the motion algorithm either has to scale the yaw cue or apply a 'washout' (continuous return the centre) to the platform. This is undesirable as the human vestibular is very sensitive to these cues.

The configuration of a motion platform with a circular support rail in accordance with such embodiments advantageously provides for unlimited yaw (i.e. in-plane rotation), and in particular unlimited yaw about a variable centre of rotation. Unlimited yaw with a variable centre of rotation is highly desirable in a vehicle simulator as it is possible to match both the yaw and change in slip of a real car in a 1:1 ratio which is crucial for cueing the feeling of oversteer and understeer to the occupant's vestibular.

Thus the circular base portion provided by such embodiments does not need to return to centre as further yaw movements can be carried out irrespective of the angle the motion platform was previously left at.

The radially moveable actuators may, at least in some embodiments, each comprise a respective radial linear motor arranged to move said radially moveable actuator around the substantially circular support rail.

While the radially moveable actuators may all move around a single track on the substantially circular support rail, embodiments are envisioned in which the support rail comprises a plurality of tracks, wherein the plurality of radially moveable actuators may move around on different tracks. For example, the radially moveable actuators connected to one control pillar may move around on a first track while the actuators connected to another control pillar may move around on a second track. There may be a track per actuator, a track per set of actuators connected to a particular control pillar, or some combination thereof.

In accordance with such embodiments, the control pillars, connected to the radially moveable actuators are free to move in plane (but are unable to move out of plane as outlined hereinabove). The control pillars may, at least in some embodiments, be supported above a flatbed on an air bed or on low friction bearings. It will be appreciated that the term 'low friction' as used herein is understood to mean that a frictional force between the control pillars and the flatbed is reduced compared to if the control pillars were to move across the flatbed without the bearings.

In some arrangements, the base portion comprises two radially moveable actuators per control pillar. In a set of such embodiments, the base portion is arranged such that:

the first control pillar is connected to first and second radially moveable actuators;

the second control pillar is connected to third and fourth radially moveable actuators; and the third control pillar is connected to fifth and sixth radially moveable actuators.

In a set of such embodiments, the base portion is arranged such that:

the first radially moveable actuator is radially adjacent the second radially moveable actuator;

the third radially moveable actuator is radially adjacent the fourth radially moveable actuator; and the fifth radially moveable actuator is radially adjacent the sixth radially moveable actuator.

In at least some such embodiments, the tension members each comprise a piston, wherein each of the radially moveable actuators comprise a piston driver arranged to vary an effective length of the piston. The piston driver may extend or retract the piston to lengthen or shorten the effective length of the piston respectively. Thus, in accordance with such embodiments, the provision of two pistons per control pillar may provide for a 'scissor-like' movement of the actuators and pistons that yields in-plane movement of the control pillars.

While two radially moveable actuators per control pillar is sufficient to allow for in-plane movement of the control pillars as outlined above, in an alternative set embodiments, the base portion comprises three radially moveable actuators per control pillar. Thus where there are three control pillars, there may be nine radially moveable actuators. Thus in a set of such embodiments, the base portion is further arranged such that:

the first control pillar is connected to a seventh radially moveable actuator;

the second control pillar is connected to an eighth radially moveable actuator; and the third control pillar is connected to a ninth radially moveable actuator.

The provision of at least three radially moveable actuators per control pillar may allow the use of a cable as the tension member and thus, in at least some such embodiments, the tension members each comprise a cable, wherein each of the radially moveable actuators comprise a cable motor arranged to vary an effective length of the cable. The cable motor may 'wind in' the cable to shorten the effective length and/or allow the cable to unwind or unravel.

In a potentially overlapping set of embodiments, the base portion is arranged such that:

the seventh radially moveable actuator is radially adjacent the third and sixth radially moveable actuators;

the eighth radially moveable actuator is radially adjacent the second and fifth radially moveable actuators; and the ninth radially moveable actuator is radially adjacent the first and fourth radially moveable actuators.

In at least some such embodiments, an angle between each of the radially moveable actuators connected to each control pillar is substantially equal to 120 degrees. Thus in accordance with such embodiments, each of the first, second, and seventh radially moveable actuators; each of the third, fourth, and eighth radially moveable actuators; and each of the fifth, sixth, and ninth radially moveable actuators, are separated by an angle of approximately 120 degrees, such that the actuators in each group are equally spaced apart. However, it will be appreciated that these angles may be adjusted as desired, e.g. to such that the tension members do not interfere with the other control pillars.

Irrespective of the type of base portion used, the physical layout of the control pillars and guide portions may be varied in accordance with design requirements. However, in some embodiments, the guide portions are arranged such that:

the first guide portion is located at a central front portion of the occupant carrier portion;

the second guide portion is located at a rear-left portion of the occupant carrier portion; and the third guide portion is located at a rear-right portion of the occupant carrier portion. In other words, in such embodiments, the motion platform may be mounted such that one control pillars is connected to the front of the occupant carrier (i.e. under the 'nose' of the occupant carrier) and the other two control pillars are connected to the rear of the occupant carrier (i.e. under the 'tail' of the occupant carrier, one per side). It will be appreciated that other layouts are envisioned, e.g. with two control pillars at the front and one control pillar at the rear.

In arrangements in which the 'first' guide portion is at the front and the 'second' and 'third' guide portions are at the rear, the first guide portion may be moved closer to or further from the second and third guide portions, depending on the requirements of the application. By moving the front (i.e. first) guide portion further from the rear (i.e. second and third) guide portions, the amount of pitch is decreased but the centre-of-gravity is lowered, which may be preferable for certain simulation applications, e.g. for motorsport use. Having the front guide portion further forward may also increase the amount of space available in which to mount an automotive console and seat. Moving the front guide portion further forward may also increase the yaw envelope around the occupant's vestibular, e.g. to approximately 60 degrees.

While the motion platform of the present invention requires the presence of three control pillars, in some embodiments the base portion may comprise one or more further control pillars each extending substantially along the third axis, each of said further control pillars being linearly moveable in the plane defined by the first and second axes, wherein the further control pillars are mechanically constrained such that they move only in said plane. For example, a fourth control pillar may be provided such that the occupant carrier portion is mounted to the base portion at four locations. In such embodiments, the control pillars may each be located at a different corner of the occupant carrier portion, e.g. at the front-left, front-right, rear-left, and rear-right, or may be located at the extremes along the surge and sway directions such that the control pillars are located at the front, rear, centre-left, and centre-right. The provision of further control pillar(s) results in an over constrained system, which may be particularly advantageous if the base portion must support a relatively high mass.

In some embodiments, the guide portions each comprise a guide rail, wherein the guide rail defines a track along which motion of the respective coupling member is constrained.

While the guide portions could be of an entirely rigid construction (e.g. a guide rail as outlined above where the coupling member slides along the rail), in some embodiments one or more of the guide portions comprise a resilient member. The resilient member could, for example, comprise a spring such as a mechanical spring. However, in at least some embodiments, the resilient member comprises a gas strut. In a preferred set of embodiments, all of the guide portions comprise a respective gas strut.

Those skilled in the art will appreciate that a gas strut uses compressed gas contained within an enclosed cylinder sealed by a sliding rod to pneumatically store potential energy and to resist any external forces applied in the direction of the rod. In some such embodiments, the gas strut(s) comprise a rod end and a cylinder end, wherein the coupling member connects the control pillar to the rod end of the respective gas strut. The gas strut(s) (or, equivalently, a different type of resilient member where appropriate) damp motion of the platform, aiding the motion platform to support the mass of the occupant carrier portion when it is moved away from the central position.

It will be appreciated that as the first, second, and third guide portions are each angled with respect to the plane defined by the first and second axes, when viewed in side view, the guide portions are 'sloped', i.e. at an incline/decline. The actual angle may vary in accordance with design parameters, e.g. to increase or reduce the authority in heave, pitch, or roll.

However, in some embodiments an angle between at least one guide portion and the plane defined by the first and second axes is between 10 degrees and 70 degrees, preferably between 20 degrees and 60 degrees, more preferably between 25 degrees and 55 degrees. In a set of embodiments, an angle between at least one guide portion and the plane defined by the first and second axes is approximately 26.5 degrees. An angle of 26.5 degrees between the guide portions and the plane of the first and second axes may provide a 2:1 ratio for the actuators. In a potentially overlapping set of embodiments, an angle between at least one guide portion and the plane defined by the first and second axes is approximately 45 degrees. An angle of 45 degrees advantageously decreases the in-plane force required from each actuator to lift the occupant carrier portion (i.e. out-of-plane). In at least some embodiments, an angle between the first guide portion and the plane defined by the first and second axes is approximately 26.5 degrees, and an angle between each of the second and third guide portions and the plane defined by the first and second axes is approximately 45 degrees.

It will be appreciated that as the first, second, and third guide portions are angled with respect to each other such that each guide portion is not parallel with the other guide portions, in plan view the guide portions are 'slanted', i.e. they converge/diverge from one another. As above, the actual angle may vary in accordance with design parameters.

However, in some embodiments an angle between the first, second, and third guide portions is between 70 degrees and 150 degrees, preferably between 80 degrees and 140 degrees, more preferably between 90 degrees and 135 degrees. In a set of embodiments, an angle between the first guide portion and each of the second and third guide portions is approximately 135 degrees. In a potentially overlapping set of embodiments, an angle between the second and third guide portions is approximately 90 degrees.

In some embodiments, an angle between the second and third guide portions is approximately 100 degrees. Compared with an angle of 90 degrees, an arrangement in which the angle between these two guide portions is 100 degrees may exhibit increased stiffness in the surge axis. This increased angle may increase the size of the platform, which may be beneficial in order to fit a particular chassis or seat.

It will be appreciated by those skilled in the art that there are a number of pivotal connection types known in the art per se that could be used to provide the pivotal connection between the control pillars and the guide portions. However, in some embodiments, one or more of the coupling members comprise a spherical ball joint. In some other embodiments, one or more of the coupling members comprise a gimbal or a universal connector.

In a particular set of embodiments in which one of more of the coupling members comprises a gimbal, the gimbal may be constructed from steel, preferably a high strength steel. The gimbal may, in some embodiments, be arranged at approximately 90 degrees to the respective guide portion. In other words, the gimbal is substantially perpendicular to the guide portion, e.g. perpendicular to the gas strut. Having the gimbal at this angle advantageously increases stiffness and may help to ensure that gimbal lock is not reached in pitch and/or roll conditions.

The occupant carrier portion may comprise a seat, steering column, and pedals. It will be appreciated that, in practice, there may be more or fewer components, and the layout of the occupant carrier portion may vary depending on the application (e.g. if it is to be used as a flight simulator instead of an automotive simulator).

The components within the occupant carrier portion may be mounted within a frame. For example, the occupant carrier portion may have a tubular frame structure. However, in some embodiments, the occupant carrier portion has a monocoque structure. A monocoque construction may advantageously provide a stiff yet lightweight structure. Similar construction techniques to those used in construction of a 'Formula One™' chassis may be used as appropriate. This monocoque structure may comprise a composite material.

As outlined hereinabove, motion of the occupant carrier portion may be achieved through use of an X-Y table or an 'unlimited yaw' circular support ring. However, both of these may be combined such that an X-Y table is mounted on an 'unlimited yaw' ring. Thus, in some embodiments, the base portion comprises:

a primary stage comprising an X-Y table portion, wherein the X-Y table portion is arranged to provide independent in-plane movement of the first, second, and third control pillars along a respective first direction and a respective second direction, said first and second directions defining a plane normal to the third axis; and a secondary stage comprising a substantially circular support rail, said support rail defining a plane normal to the third axis;

wherein the X-Y table portion is mounted to the support rail via a radially moveable bearing members arranged to move around the circumference of the circular support rail;

wherein the secondary stage further comprises a radial motor arranged to drive rotational motion of the primary stage relative to the secondary stage.

Such an arrangement may therefore provide the benefits of both the X-Y table and the unlimited yaw ring. Specifically, the X-Y table provides a 'primary stage' that is used for cueing motions in the surge, sway, and heave directions (i.e. along the x-, y-, and z-axes respectively), and rotational motions in the roll, pitch, and yaw directions (i.e. about the x-, y-, and z-axes respectively). The unlimited yaw ring (i.e. the circular support rail and radially moveable bearing members) provides a 'secondary stage' that overcomes any potential issue with the motion platform 'running out' of yaw on the primary stage. While including both may increase the overall size and mass of the motion platform, increasing the yaw available on the primary (X-Y table) stage is also highly advantageous for cueing 1:1 yaw at a high rate of acceleration. Having a primary stage with such a high rate of yaw available with a low yaw inertia means that rapid accelerations can be replicated on the motion platform.

The yaw table compliments the primary stage to ensure that yaw travel remains both highly dynamic and unlimited. As long as the yaw table can accelerate to the maximum velocity within the time taken at the primary stage to reach its limit of rotation, there should be no degradation in performance when these stages are mounted on top of each other.

As outlined above, the primary (i.e. X-Y table) stage may rotate around the circumference of the circular support rail on bearing members. These bearing members (or 'bearing blocks') may be connected directly to the X-Y table portion, however in some embodiments the motion platform further comprises a bed positioned between the bearing members and the X-Y table portion, such that the X-Y table portion is mounted on or includes the bed, and the bed is mounted on the bearing members. Alternatively, the bed may form an integral part of the X-Y table portion.

In some embodiments, the secondary stage may comprise a plurality of concentric substantially circular support rails, each support rail being coplanar and defining a respective plane normal to the third axis. Where the X-Y table is provided with radially moveable bearing members (i.e. bearing blocks) that move around a circumference of a circular support rail as outlined above, these may move around one of the concentric circular support rails, with the others simply providing support, however radially moveable bearing members may, in some embodiments, move around more than one, and potentially all, of the concentric circular support rails. In a particular set of embodiments, the yaw table may comprise three concentric support rails. However, arrangements having a different number of rails may be suitable for particular applications as appropriate.

Generally, the radial motor will be arranged such that its forcer (i.e. the part that moves) is connected to the X-Y table, or to the intermediary bed in embodiments where one is provided. The stationary magnets of the radial motor will generally be fixed with respect to the yaw table, e.g. these may be fixed to the base of the yaw table. While there are a number of radial motors known in the art per se, the radial motor may, in some embodiments, comprise a radial linear motor.

It will be appreciated that the optional features described hereinabove in relation to the X-Y table and circular support rail arrangements alone also apply to a set of embodiments in which these two arrangements are used in combination, as appropriate.

BRIEF DESCRIPTION OF THE DRAWINGS

Certain embodiments of the present invention will now be described with reference to the accompanying drawings, in which.

DETAILED DESCRIPTION

Figure 1:
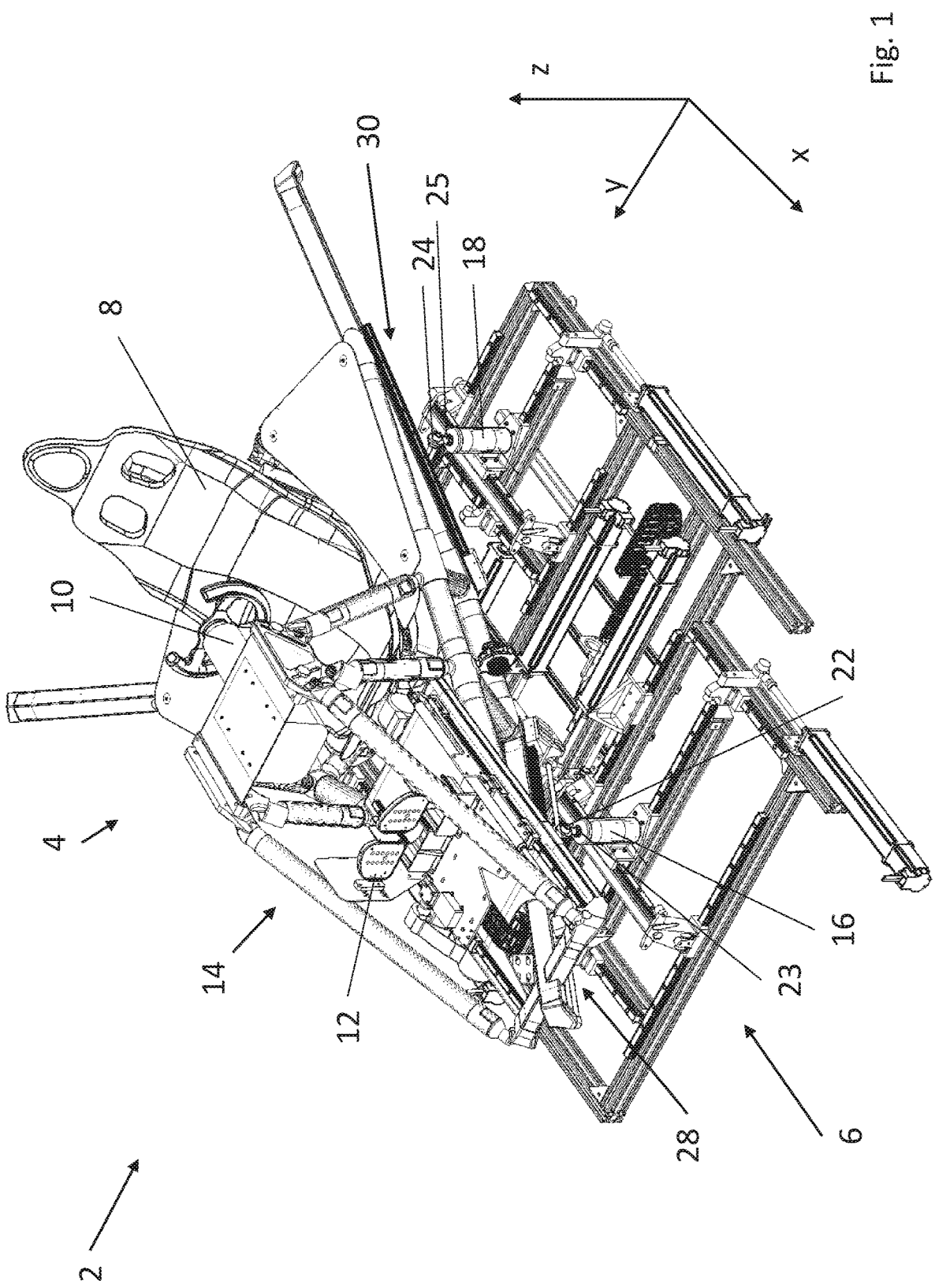
FIG. 1 is an isometric view of a motion platform in accordance with an embodiment of the present invention.

FIG. 1 is an isometric view of a motion platform 2 in accordance with an embodiment of the present invention. The motion platform 2 comprises an occupant carrier portion 4 and a base portion 6. In the example shown in FIG. 1, the base portion 6 includes an X-Y table, however a circular 'unlimited yaw' base could be used instead, as outlined below with reference to FIGS. 9 and 10.

The six degrees of freedom of the motion platform 2 correspond to linear movements in the surge, sway, and heave directions (i.e. along the x-, y-, and z-axes respectively), and rotational motions in the roll, pitch, and yaw directions (i.e. about the x-, y-, and z-axes respectively).

The occupant carrier portion 4 comprises a seat 8, steering column 10, and pedals 12 mounted within a frame 14. It will be appreciated that, in practice, there may be more or fewer components, and the layout of the occupant carrier portion 4 may vary depending on the application (e.g. if it is to be used as a flight simulator instead of an automotive simulator). The occupant carrier portion 4 of the motion platform 2 can be seen in more detail in FIG. 2, which provides an isometric view of the occupant carrier portion 4.

The base portion 6 comprises three control pillars 16, 18, 20, where two of these control pillars 16, 18—the front control pillar 16 and the rear-left control pillar 18—are shown in FIG. 1 while the rear-right control pillar 20 is obscured from view by the occupant carrier portion 4. The layout of all three control pillars 16, 18, 20 may be readily understood from FIGS. 3, 4*a-f*, and 8.

In this example, each control pillar 16, 18, 20 is constructed as a cylindrical 'post'. Importantly, each pillar 16, 18, 20 is of a fixed height such that the distance from the top to the bottom of the pillar 16, 18, 20 (i.e. in the z-direction) cannot change. A spherical ball joint 22, 24, 26 is provided at the top of each control pillar 16, 18, 20.

In this particular example, the spherical ball joints 22, 24, 26 are connected to a respective threaded bolt 23, 25, 27 (i.e. a threaded member), which can be loosened or tightened so as to change the predetermined height of the corresponding control pillar 16, 18, 20. Any adjustment in the predetermined heights of the control pillars 16, 18, 20 is carried out while the motion platform 2 is not in operation, as the respective heights of the control pillars 16, 18, 20 remain constant while the motion platform 2 is in use.

Figure 2:
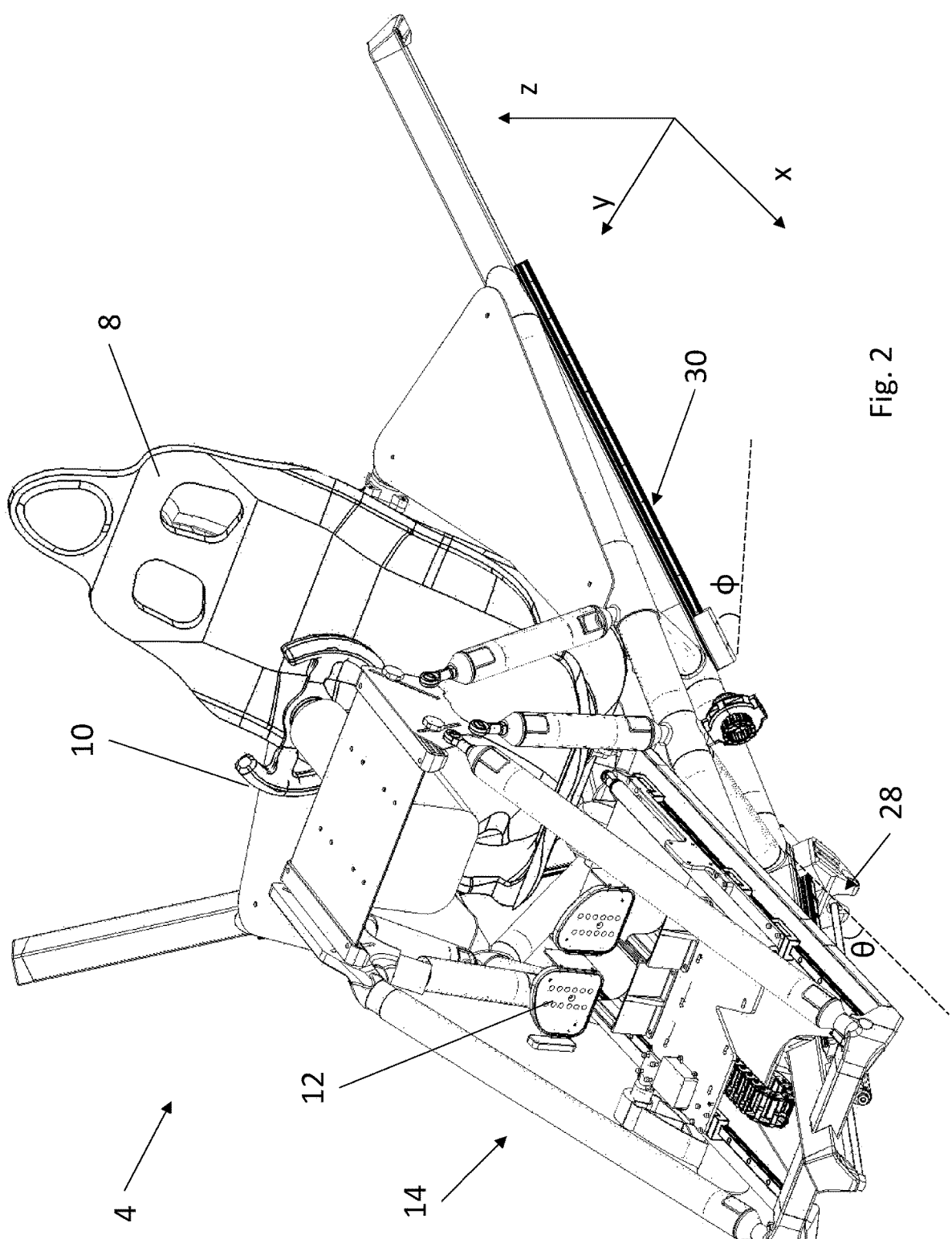
FIG. 2 is an isometric view of the occupant carrier portion of the motion platform of FIG. 1.

The occupant carrier portion 4 comprises three guide rails 28, 30, 32, where two of these rails 28, 30—the front rail 28 and the rear-left rail 30—are shown in FIGS. 1 and 2 while the rear-right guide rail 32 is obscured from view by the rest of the occupant carrier portion 4. The layout of all three guide rails 28, 30, 32 may be readily understood from FIG. 6.

The angle θ between the front guide rail 28 and the x-y plane defined by the x- and y-axes is approximately 26.5 degrees. The angle φ between the rear guide rails 30, 32 and the x-y plane is approximately 45 degrees. An angle φ of 45 degrees advantageously decreases the in-plane force required from each actuator to lift the occupant carrier portion 4, i.e. out-of-plane heave motions in the z-axis direction.

Figure 6:
FIG. 6 is a plan view of a motion platform on an X-Y table base portion in accordance with an embodiment of the present invention.

As may be more readily seen with reference to the plan view of the motion platform 2 shown in FIG. 6, the guide rails 28, 30, 32 are also angled with respect to each other. The angle α between the front guide rail 28 and each of the rear guide rails 30, 32 is approximately 135 degrees while the angle β between the rear guide rails 30, 32 is approximately 90 degrees.

By way of non-limiting example, by angling the rear rails (in plan view) at 90 degrees to each other such that when the platform is in the centre (i.e. null) position, the angle is at 45 degrees to both the x and y axis, the force required to move the rear left or right corners is shared equally by the x and y actuators. However, when in the centre position, the guide is parallel to the y axis, meaning that lifting the front of the occupant carrier portion up and down may require the y actuator to provide all of the required force. If, by design, the centre of gravity is over the rear pillars, the force required to lift the front is significantly less than the rear so this is generally not an issue. As a consequence, an actuator in the x axis does not have to provide any force in order to move the front of the occupant carrier up and down, meaning there may be maximum force available for yaw movements, which is highly desirable in some applications.

The spherical ball joints 22, 24, 26 provided at the top of each control pillar 16, 18, 20 are pivotally connected to the guide rails 28, 30, 32. Specifically, the ball joint 22 at the top of the front control pillar 16 is connected to the front guide rail 28; the ball joint 24 at the top of the rear-left control pillar 18 is connected to the rear-left guide rail 30; and the ball joint 26 at the top of the rear-right control pillar 20 is connected to the rear-right guide rail 32. These spherical ball joints 22, 24, 26 are thus coupling members that may slide along the respective guide rail 28, 30, 32 and allow the occupant carrier portion 4 to tilt.

As the control pillars 16, 18, 20 are each of a fixed height, the occupant carrier portion 4 is unable to move in any axis without moving a control pillar 16, 18, 20 and is mechanically constrained by the control pillars 16, 18, 20. This motion platform 2 could also use a circular 'unlimited yaw' platform as described with reference to FIGS. 11 and 12 below (or another suitable arrangement), but in any such arrangement, the underlying design principle is that it is possible to convert movements of the control pillars 16, 18, 20 in the x- and y-directions (i.e. in the x-y plane) into an out-of-plane motion in the z-direction by means of positioning the control pillars 16, 18, 20 in a known position so as to force the platform 2 to move into the desired attitude. Such movements are outlined in further detail with reference to FIGS. 3 and 4*a-f*.

Figure 3:
FIG. 3 is a plan view schematic that shows the central position of the motion platform of FIG. 1.

FIG. 3 is a plan view schematic that shows the central position of the motion platform 2 of FIG. 1. The control pillars 16, 18, 20 may each move, independently, in the x- and y-directions, i.e. they may move within the x-y plane. For ease of understanding, the schematic drawings of FIGS. 3 and 4*a-f* simplify the construction of the motion platform 2 for illustrative purposes only.

In this central or 'null' position, the motion platform 6 has not undergone any surge, sway, heave, roll, pitch, or yaw motions, i.e. it is the 'default' position of the motion platform 2.

FIGS. 4*a-f* are plan view schematics that show the six degrees of freedom provided by the motion platform 2 of FIG. 1. Specifically, these schematics illustrate the movements of the control pillars 16, 18, 20 that are carried out to achieve surge, sway, heave, pitch, roll, and yaw motions. It will, of course, be appreciated that the specific set of motions shown are a limited set shown for illustrative purposes in order to depict the respective positions of the control pillars 16, 18, 20 for the maximum of each motion in one direction. In practice, the control pillars 16, 18, 20 to move the occupant carrier portion 4 will shift between these positions as appropriate for the desired cues.

Figures 4A, 4B, 4C, 4D, 4E, 4F:
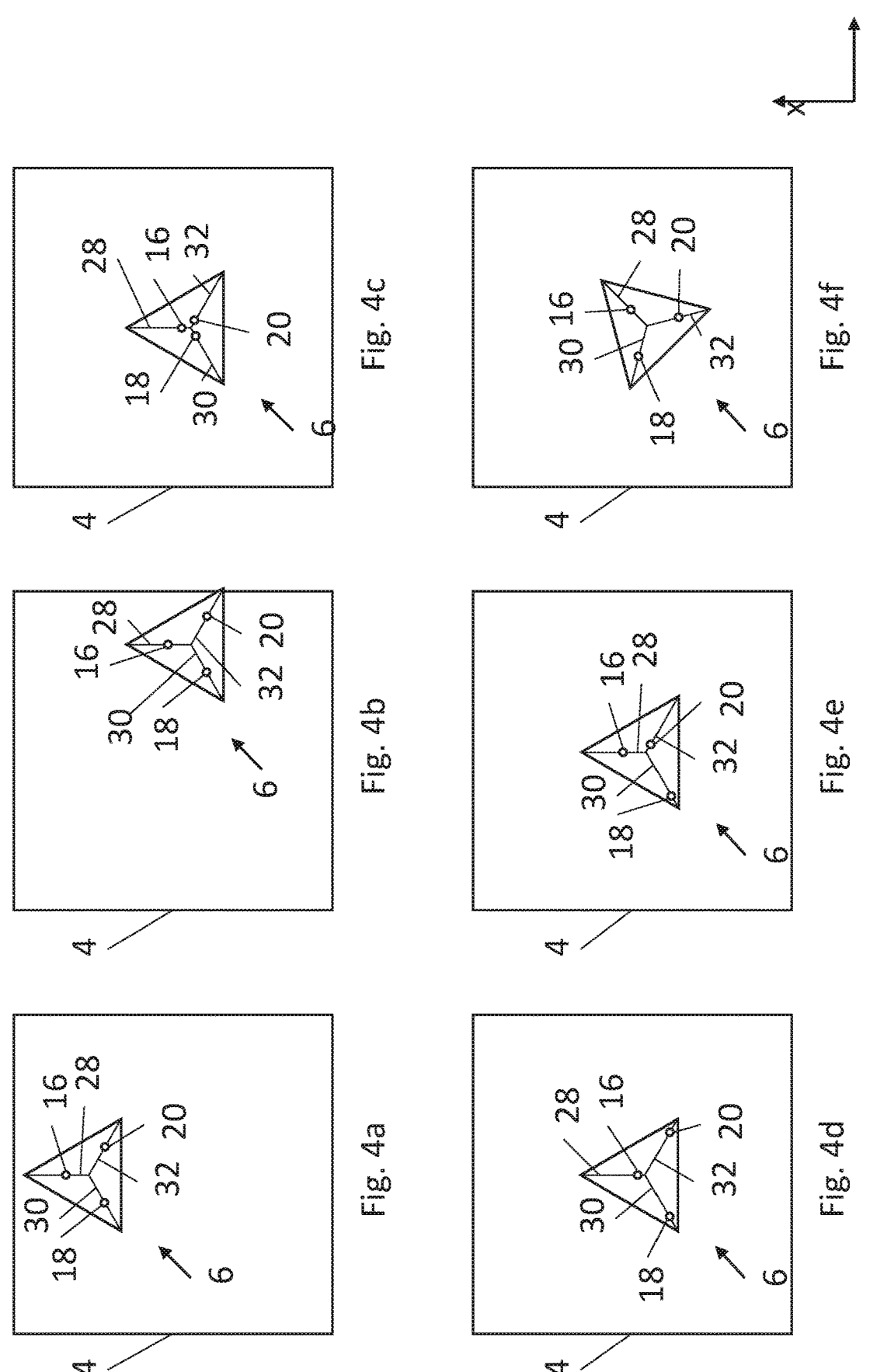
FIGS. 4a-f are plan view schematics that show the six degrees of freedom provided by the motion platform of FIG. 1.

FIG. 4*a* shows the position of the control pillars 16, 18, 20 that achieves maximum positive surge movement, i.e. in the x-axis. In order to achieve this, all three control pillars 16, 18, 20 are moved in the positive x-axis direction, while the y-axis position of the control pillars 16, 18, 20 is not changed. Moving all three control pillars 16, 18, 20 in the negative x-axis direction would instead result in a negative surge movement.

FIG. 4*b* shows the position of the control pillars 16, 18, 20 that achieves maximum positive sway movement, i.e. in the y-axis. In order to achieve this, all three control pillars 16, 18, 20 are moved in the positive y-axis direction, while the x-axis position of the control pillars 16, 18, 20 is not changed. Moving all three control pillars 16, 18, 20 in the negative y-axis direction would instead result in a negative sway movement.

FIG. 4*c* shows the position of the control pillars 16, 18, 20 that achieves maximum positive heave movement, i.e. in the z-axis. In order to achieve this, all three control pillars 16, 18, 20 are moved toward the centre of the base portion 4, by moving in the x- and y-axis directions as appropriate. In this example, the guide rails 28, 30, 32 are all angled 'upwards' such that moving the three control pillars 16, 18, 20 toward the centre means that the mass of the occupant carrier portion 4 is pushed upwards (i.e. as the pivotal connection of the control pillars 16, 18, 20 shifts toward the lowest point of the guide rails in the z-axis direction).

Moving all three control pillars 16, 18, 20 away from centre of the base portion 4 would lead to a negative heave motion, i.e. the opposite direction in the z-axis.

If the guide rails 28, 30, 32 were all angled 'downwards' instead, moving the control pillars 16, 18, 20 in this way would instead result in a negative heave motion. The angling of the guide rails 28, 30, 32 could also be 'non-matching' instead such that some of the guide rails 28, 30, 32 are angles upwards and some downwards, with appropriate changes to which control pillars 16, 18, 20 move inwards or outwards.

FIG. 4d shows the position of the control pillars 16, 18, 20 that achieves maximum positive pitch movement, i.e. about the y-axis. In order to achieve this, the front control pillar 16 is moved toward the centre of the base portion 6 while the rear control pillars 18, 20 are moved away from centre of the base portion 6. Due to the angling of the guide rails 28, 30, 32, this causes the occupant carrier portion 4 to rotate about the y-axis such that the 'nose' of the occupant carrier portion 4 tilts upwards.

Moving the front control pillar 16 away from the centre of the base portion 6 while moving the rear control pillars 18, 20 toward the centre of the base portion 6 would result in a negative pitch movement instead.

FIG. 4e shows the position of the control pillars 16, 18, 20 that achieves maximum positive roll movement, i.e. about the x-axis. In order to achieve this, the front control pillar 16 is left in the null position while the rear-left control pillar 18 is moved away from the centre of the base portion 6 and the rear-right control pillar 20 moves toward the centre of the base portion 6. This causes the occupant carrier portion 4 to rotate about the x-axis such that the occupant carrier portion 4 'banks' to one side. If the movements of the rear control pillars 18, 20 were reversed (i.e. the rear-left control pillar 18 toward and the rear-right control pillar 20 away from the centre), the occupant carrier portion 4 would rotate about the x-axis in the other direction such that the occupant carrier portion 4 would bank to the other side.

FIG. 4f shows the position of the control pillars 16, 18, 20 that achieves maximum positive yaw movement, i.e. about the z-axis. In order to achieve this, all three control pillars 16, 18, 20 are moved toward the position of the next control pillar 16, 18, 20 clockwise. This causes the occupant carrier portion 4 to rotate about the z-axis such that the occupant carrier portion 4 'pivots' in place. Moving the three control pillars 16, 18, 20 anticlockwise instead would, of course, result in a negative yaw movement, i.e. about the z-axis in the other direction.

Figure 5:
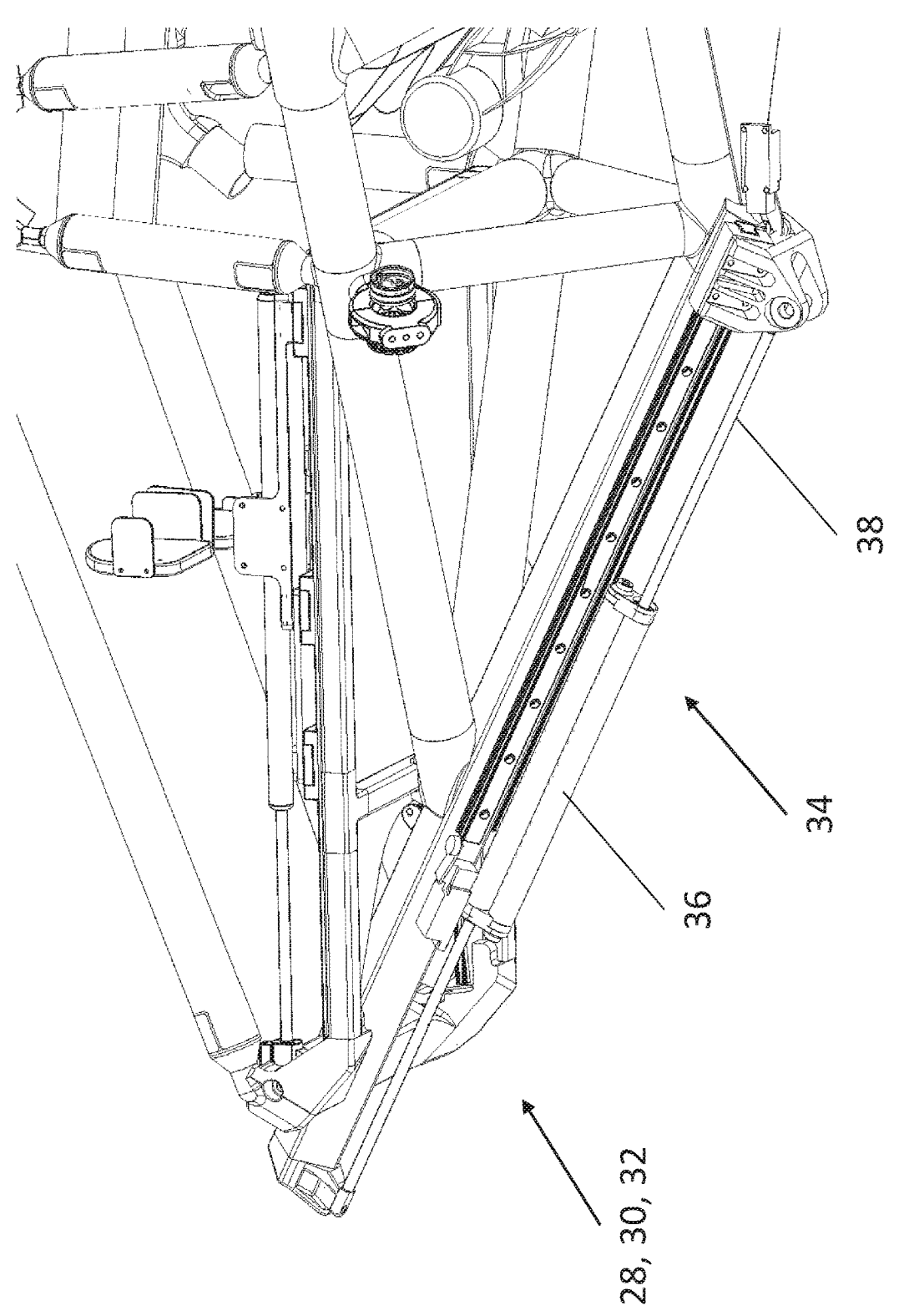
FIG. 5 is an isometric view of a guide portion employing a gas strut in accordance with an embodiment of the present invention.

FIG. 5 is an isometric view of a guide portion employing a gas strut in accordance with an embodiment of the present invention. As can be seen in FIG. 5, the guide rails 28, 30, 32 described above may be provided with a gas strut (i.e. a gas spring) 34. The gas strut 34 is constructed from a cylinder end 36 and a rod end 38, where the cylinder end 36 is filled with a gaseous medium that is sealed in by the rod end 38. This gaseous medium is increasingly compressed and the rod end 38 moves into the cylinder end 36.

The spherical ball joint 22, 24, 26 at the top of the appropriate control pillar 16, 18, 20 may be connected to one end, e.g. the rod end 38, of the gas strut 34. The gas strut 34 provides damping and helps to support the mass of the occupant carrier portion 4. However, the use of gas strut(s)

is not essential, and the spherical ball joints 22, 24, 26 may be connected so as to slide along the guide rails 28, 30, 32 instead.

Figure 7:
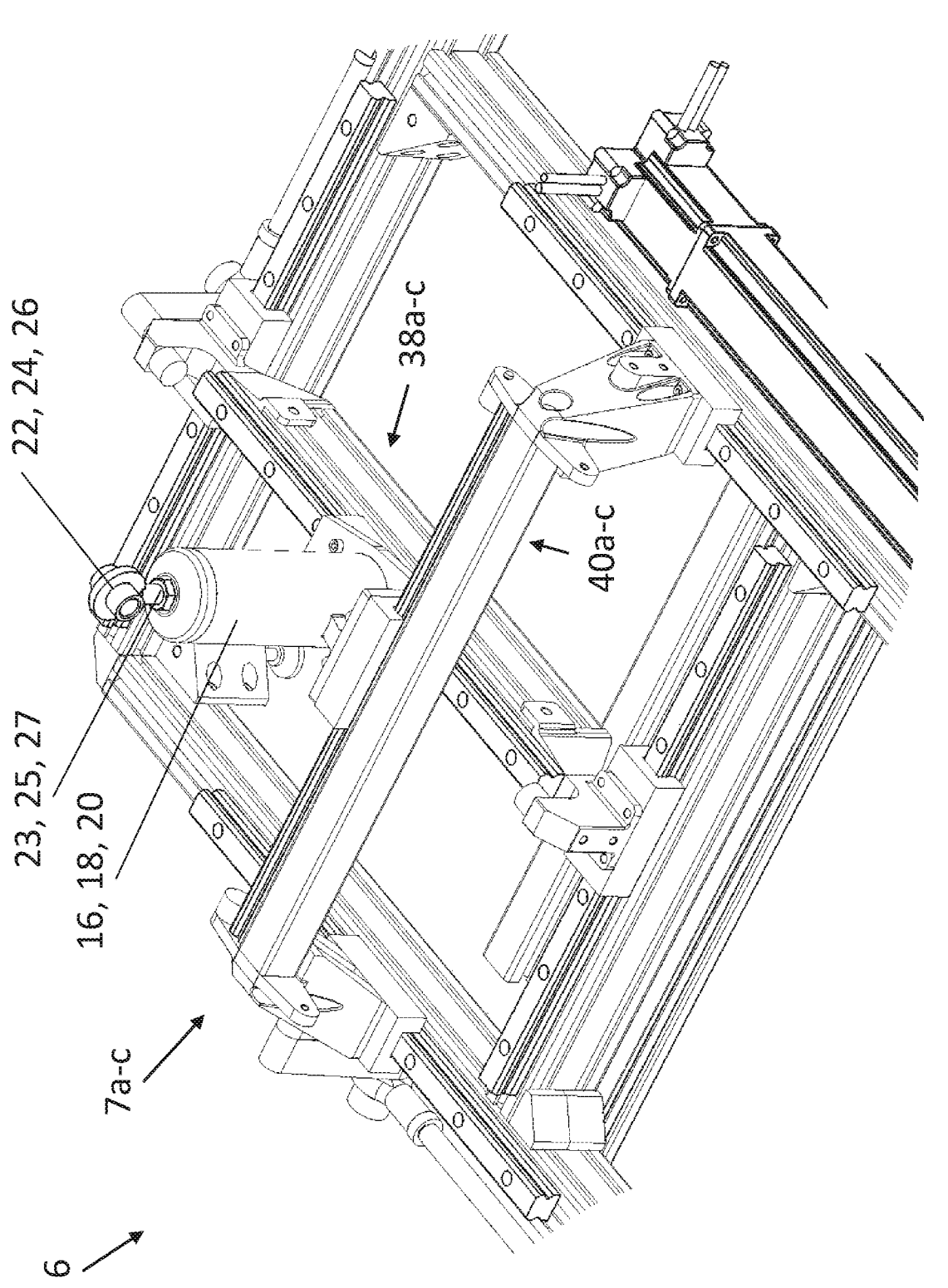
FIG. 7 is an isometric view of a section of the X-Y table base portion of FIG. 6.
Figure 8:
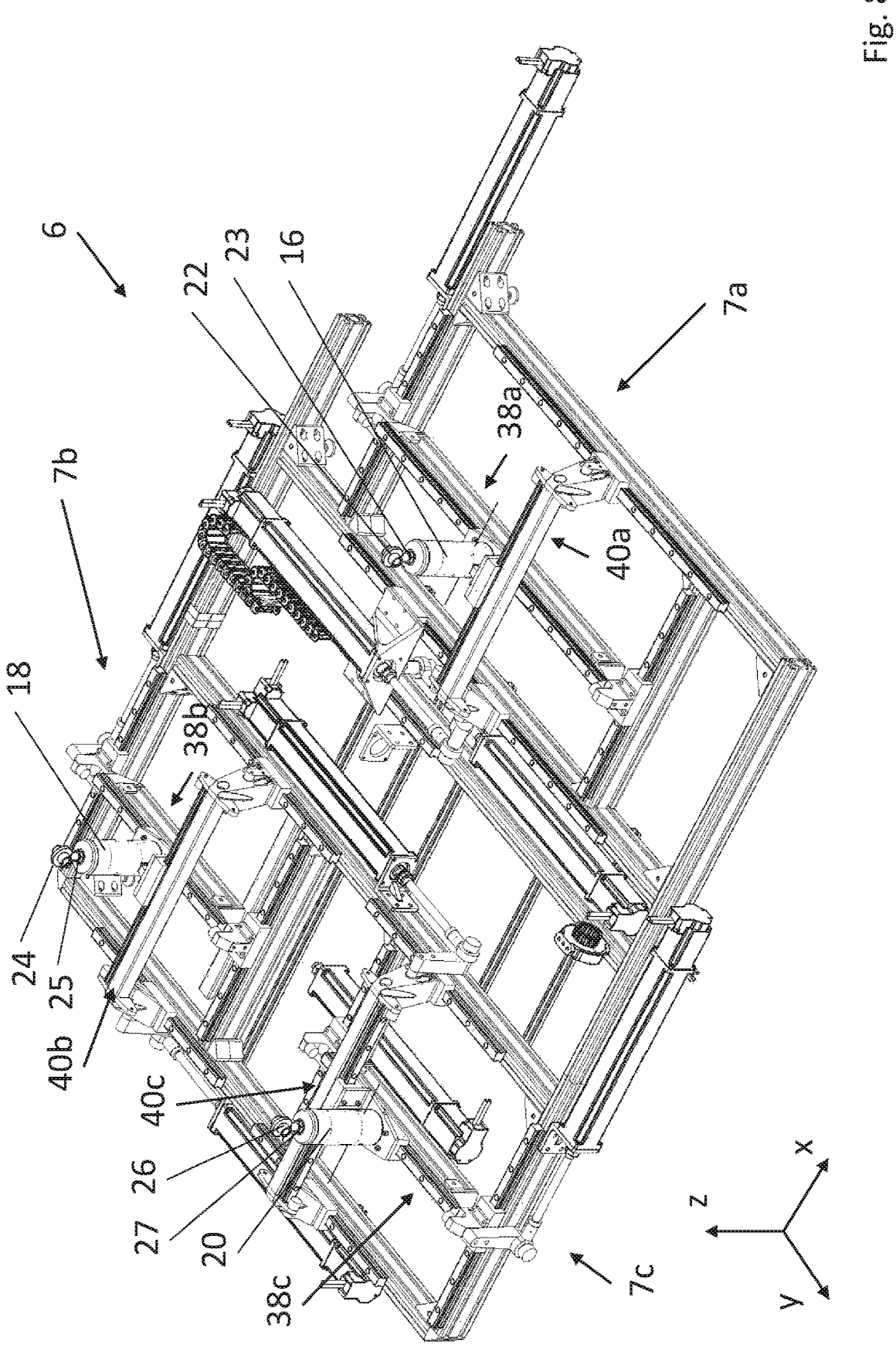
FIG. 8 is an isometric view of the X-Y table base portion of FIG. 6.

FIG. 6 is a plan view of a motion platform on an X-Y table base portion 6 in accordance with an embodiment of the present invention. The X-Y table base portion 6 is seen closer up in FIG. 7 which is an isometric view of a section of the X-Y table base portion of FIG. 6, specifically one of the three X-Y tables 7a-c. FIG. 8 provides an isometric view of the entire X-Y table base portion 6 of FIG. 6.

The X-Y table base portion 6 is constructed from three X-Y tables 7a-c, one for each control pillar 16, 18, 20.

Each of said X-Y tables 7a-c comprises first and second slide rails 38a-c, 40a-c that are slideably moveable relative to one another, i.e. they can slide adjacent to each other under control of e.g. a linear motor. There are a number of X-Y table arrangements known in the art per se, however in this example the X-Y table base portion 6 uses six ball screw actuators, i.e. two per X-Y table 7a-c.

Each slide rail 38a-c, 40a-c provides for movement along one of two orthogonal directions, either the x-axis direction or the y-axis direction (with one slide rail 38a-c, 40a-c per direction). In this example, the first slide rail 38a-c provides motion in the x-axis direction and the second slide rail 40a-c provides motion in the y-axis direction. Thus a sliding movement of the first slide rail 38a-c moves the corresponding control pillar 16, 18, 20 along the x-axis (i.e. surge) direction and the second slide rail 40a-c moves the corresponding control pillar 16, 18, 20 along the y-axis (i.e. sway) direction. Thus each X-Y table 7a-c moves a control pillar 16, 18, 20 in the x-y plane.

Figure 9:
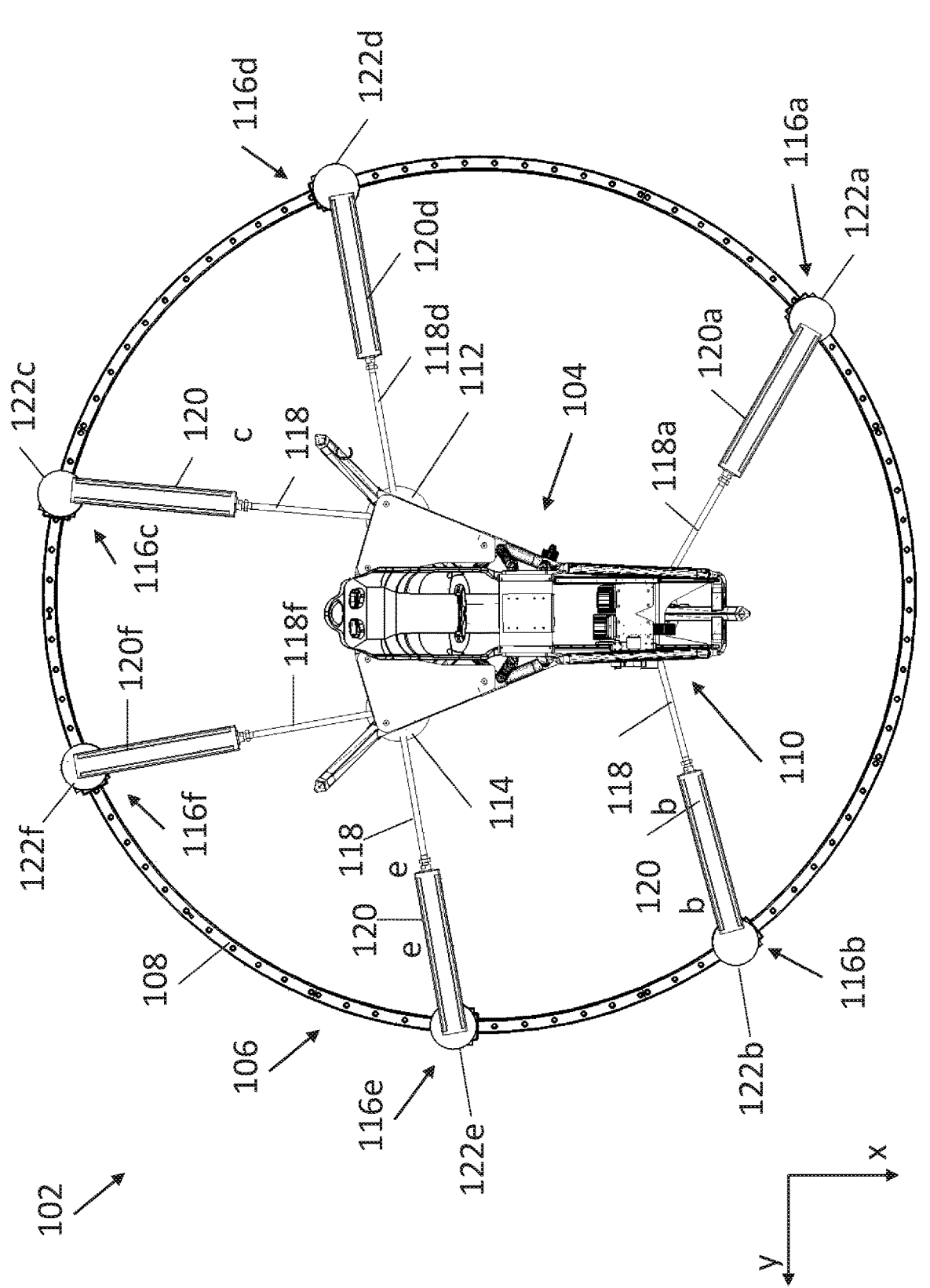
FIG. 9 is a plan view of a motion platform on an unlimited yaw base portion in accordance with an embodiment of the present invention.
Figure 10:
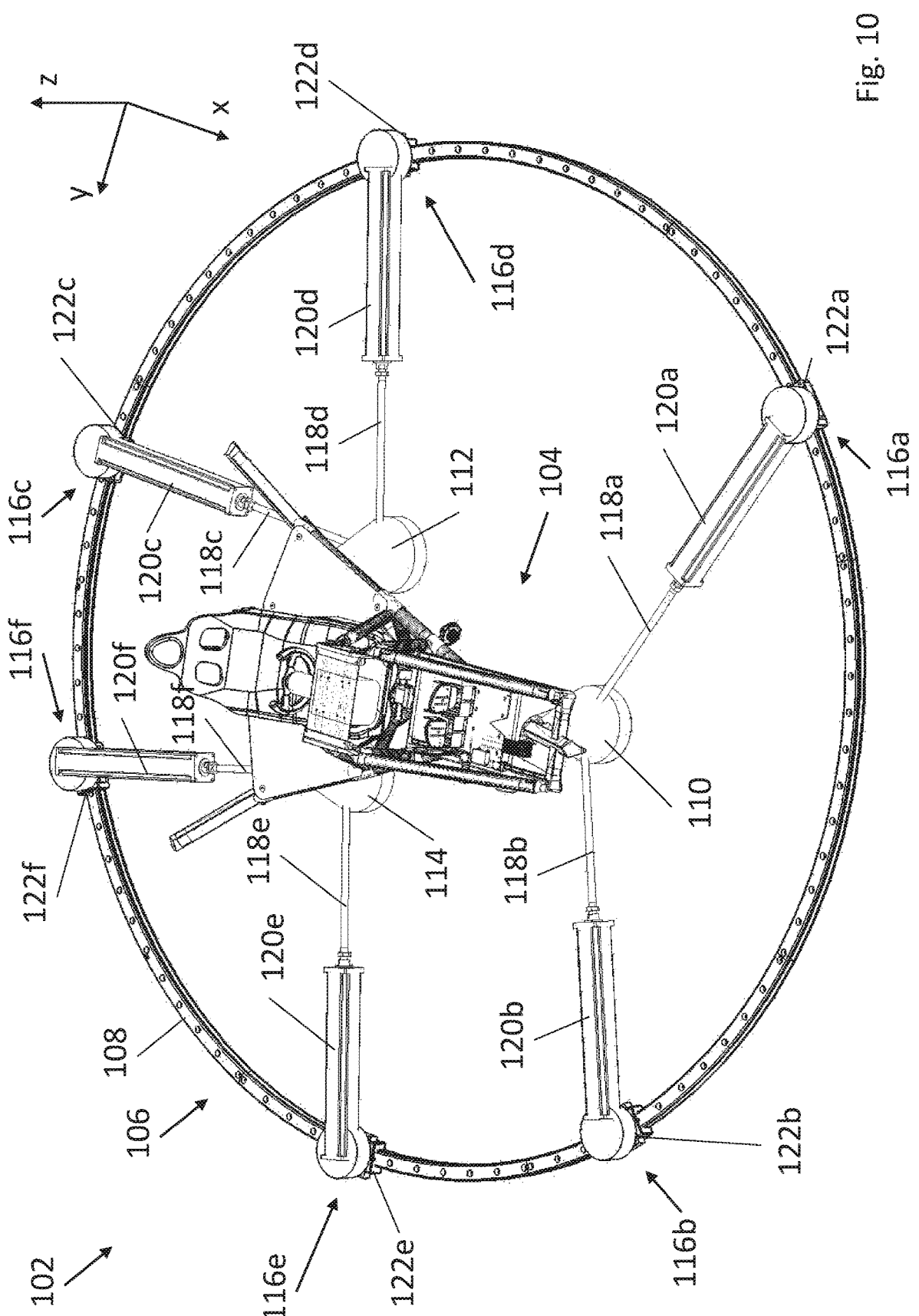
FIG. 10 is an isometric view of the unlimited yaw base portion of FIG. 9.

FIG. 9 is a plan view of a motion platform 102 on an unlimited yaw base portion 106 in accordance with an embodiment of the present invention. FIG. 10 is an isometric view of the motion platform 102 of FIG. 9. The motion platform 102 comprises an occupant carrier portion 104 and base portion 106, where the occupant carrier portion is provided with at least three guide rails (not shown in FIGS. 9 and 10) that are angled both with respect to the x-y plane and to each other as described previously with regard to the motion platform 2 of FIG. 1.

The base portion 106 comprises first, second, and third control pillars 110, 112, 114 that are connected to a plurality of radially moveable actuators 116a-f. The connection between the control pillars 110, 112, 114 and the angled guide rails on the occupant carrier portion 104 is provided by a pivotal connection as described previously. The control pillars 110, 112, 114 of the base portion 106 shown in FIGS. 9 and 10 are conic, rather than cylindrical, but still have a fixed height. It will be appreciated that these control pillars 110, 112, 114 could be cylindrical instead (and similarly, the control pillars 16, 18, 20 described above could be conic; and any of the control pillars 16, 18, 20, 110, 112, 114 described herein could take any suitable shape).

Each control pillar 110, 112, 114 is connected to two of the actuators 116a-f such that the first (i.e. front) control pillar 110 is connected to first 116a and second 116b, radially moveable actuators; the second (i.e. rear-left) control pillar 112 is connected to third 116c and fourth 116d radially moveable actuators; and the third (i.e. rear-right) control pillar 114 is connected to fifth 116e and sixth 116f radially moveable actuators.

Each connection between the control pillars 110, 112, 114 and the respective radially moveable actuators 116a-f is provided by a respective piston 118a-f (i.e. a tension member). The radially moveable actuators 116a-f are arranged to move around the circumference of the circular support rail 108, which provides a track for the movement of the actuators 116*a-f*.

The radially moveable actuators 116*a-f* each comprise a piston driver 120*a-f* arranged to vary an effective length of the corresponding piston 118*a-f*. The piston driver 120*a-f* may extend or retract the piston 118*a-f* to lengthen or shorten the piston 118*a-f*. The actuators 116*a-f* also each comprise a respective radial linear motor 122*a-f* that provides for movement of the radially moveable actuator 116*a-f* around the circular support rail 108, where motion of the control pillars 110, 112, 114 is mechanically constrained to in-plane movements only (i.e. within the x-y plane).

The configuration of the motion platform 102 with the circular support rail 108 advantageously provides for unlimited yaw (i.e. in-plane rotation in the x-y plane), where the centre of rotation may be varied as required. Unlimited yaw with a variable highly desirable in a vehicle simulator as doing because this makes it possible to match the yaw and change in slip of a real car in a 1:1 ratio which is crucial for cueing the feeling of oversteer and understeer to the occupant's vestibular.

By moving the radially moveable actuators 116*a-f* around the circumference of the circular support rail 108 and by lengthening and shortening the pistons 118*a-f* as appropriate, the motion platform 102 provides surge, sway, heave, pitch, roll, and yaw movements by moving the control pillars 110, 112, 114 only in the x-y plane using a 'scissor-like' movement of the actuators 116*a-f*. The configurations of the control pillars 110, 112, 114 that provide each of these motions is substantially the same as those described in FIGS. 4*a-f* (assuming that the guide rails of the occupant carrier portion 104 in the motion platform 102 match those of the occupant carrier portion 4 in the motion platform 2 of FIG. 1), however there is no longer a 'central' position with respect to the in-plane (i.e. in the x-y plane) rotation of the occupant carrier portion 104.

Figure 11:
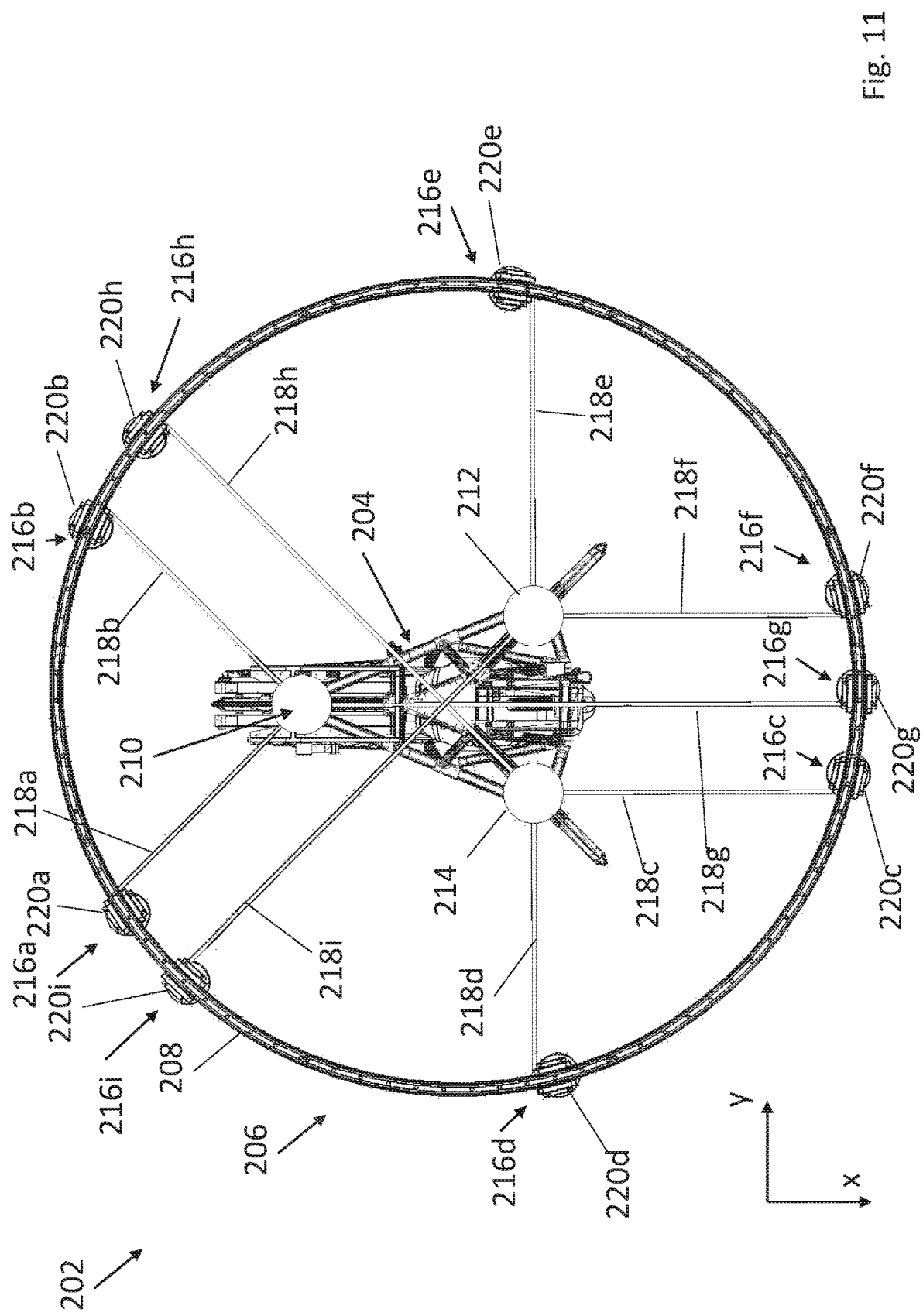
FIG. 11 is a plan view of a motion platform on a further unlimited yaw base portion in accordance with an embodiment of the present invention.
Figure 12:
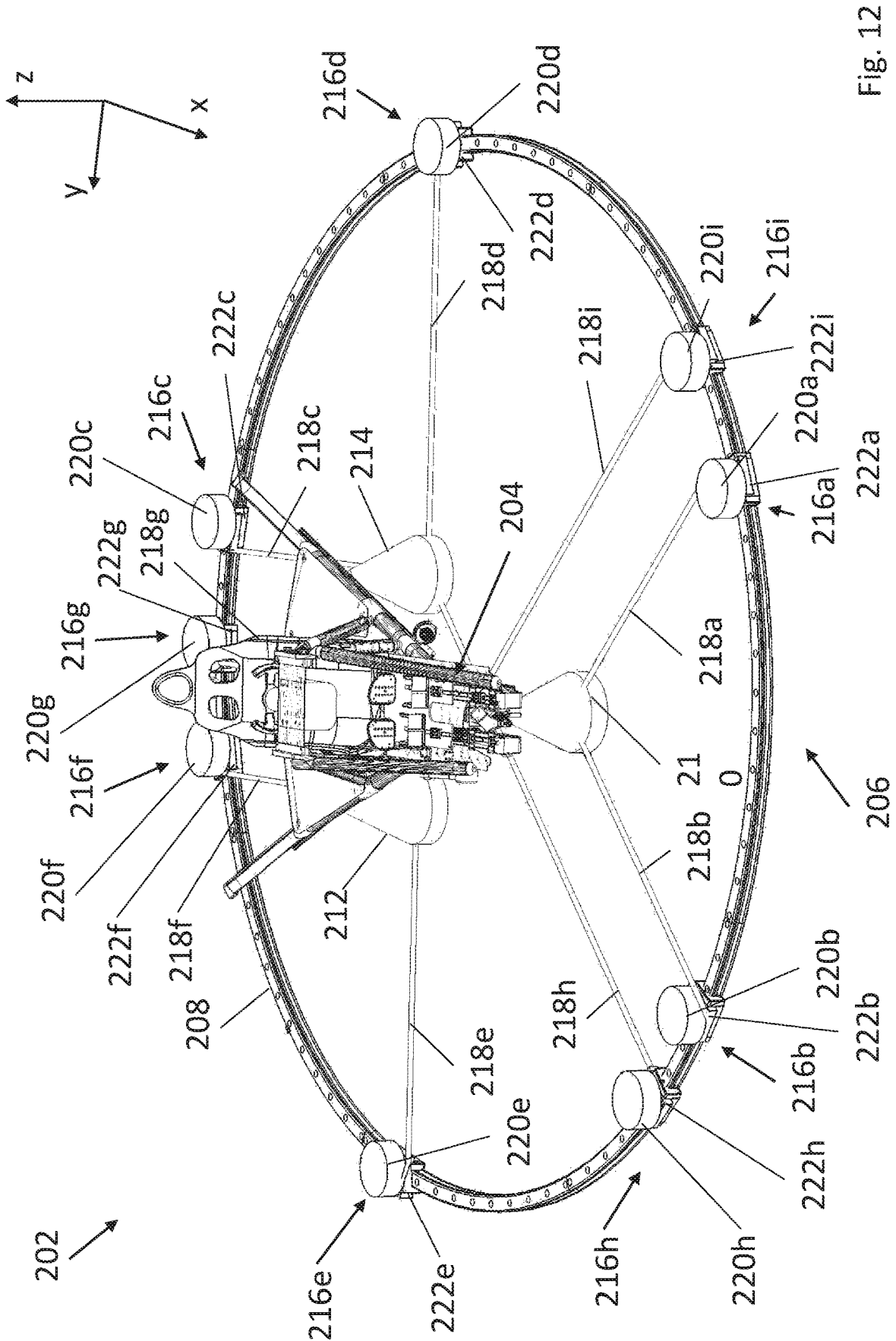
FIG. 12 is an isometric view of the unlimited yaw base portion of FIG. 11.

FIG. 11 is a plan view of a motion platform 202 on an unlimited yaw base portion 206 in accordance with a further embodiment of the present invention. FIG. 12 is an isometric view of the motion platform 202 of FIG. 11. The motion platform 202 comprises an occupant carrier portion 204 and base portion 206, where the occupant carrier portion is provided with at least three guide rails (not shown in FIGS. 11 and 12) that are angled both with respect to the x-y plane and to each other as described previously with regard to the motion platform 2 of FIG. 1.

In the motion platform 202 of FIG. 11, the base portion 206 comprises a substantially circular support rail 208. This circular support rail 208 provides a track around which a number of radially moveable actuators can move in the x-y plane, i.e. the plane of the support rail 208 is normal to the z-axis.

The base portion 206 comprises first, second, and third control pillars 210, 212, 214 that are connected to a plurality of radially moveable actuators 216*a-i*. The connection between the control pillars 210, 212, 214 and the angled guide rails on the occupant carrier portion 204 is provided by a pivotal connection as described previously. The control pillars 210, 212, 214 of the base portion 206 shown in FIGS. 11 and 12 are conic, rather than cylindrical, but still have a fixed height. It will be appreciated that these control pillars 210, 212, 214 could be cylindrical instead (and as outlined above, the control pillars 210, 212, 214 described could take any suitable shape).

Each control pillar 210, 212, 214 is connected to three of the actuators 216*a-i* such that the first (i.e. front) control pillar 210 is connected to first 216*a*, second 216*b*, and seventh 216*g* radially moveable actuators; the second (i.e. rear-left) control pillar 212 is connected to third 216*c*, fourth 216*f*, and eighth 216*h* radially moveable actuators; and the third (i.e. rear-right) control pillar 214 is connected to fifth 216*e*, sixth 216*f*, and ninth 216*i* radially moveable actuators.

Each connection between the control pillars 210, 212, 214 and the respective radially moveable actuators 216*a-i* is provided by a respective cable 218*a-i* (i.e. a tension member). The radially moveable actuators 216*a-i* are arranged to move around the circumference of the circular support rail 208, which provides a track for the movement of the actuators 216*a-i*.

The radially moveable actuators 216*a-i* each comprise a cable motor 120*a-i* arranged to vary an effective length of the corresponding cable 218*a-i*. The cable motor 120*a-i* may 'wind in' the cable 218*a-i* to shorten the effective length and/or allow the cable 218*a-i* to unwind or unravel. The actuators 216*a-i* also each comprise a respective radial linear motor 122*a-i* that provides for movement of the radially moveable actuator 216*a-i* around the circular support rail 208, where motion of the control pillars 210, 212, 214 is mechanically constrained to in-plane movements only (i.e. within the x-y plane).

The configuration of the motion platform 202 with the circular support rail 208 advantageously provides for unlimited yaw (i.e. in-plane rotation in the x-y plane), where the centre of rotation may be varied as required. Unlimited yaw with a variable highly desirable in a vehicle simulator as doing because this makes it possible to match the yaw and change in slip of a real car in a 1:1 ratio which is crucial for cueing the feeling of oversteer and understeer to the occupant's vestibular.

By moving the radially moveable actuators 216*a-i* around the circumference of the circular support rail 208 and by lengthening and shortening the cables 218*a-i* as appropriate, the motion platform 202 provides surge, sway, heave, pitch, roll, and yaw movements by moving the control pillars 210, 212, 214 only in the x-y plane. The configurations of the control pillars 210, 212, 214 that provide each of these motions is substantially the same as those described in FIGS. 4*a-f* (assuming that the guide rails of the occupant carrier portion 204 in the motion platform 202 match those of the occupant carrier portion 4 in the motion platform 2 of FIG. 1), however there is no longer a 'central' position with respect to the in-plane (i.e. in the x-y plane) rotation of the occupant carrier portion 204.

Figure 13:
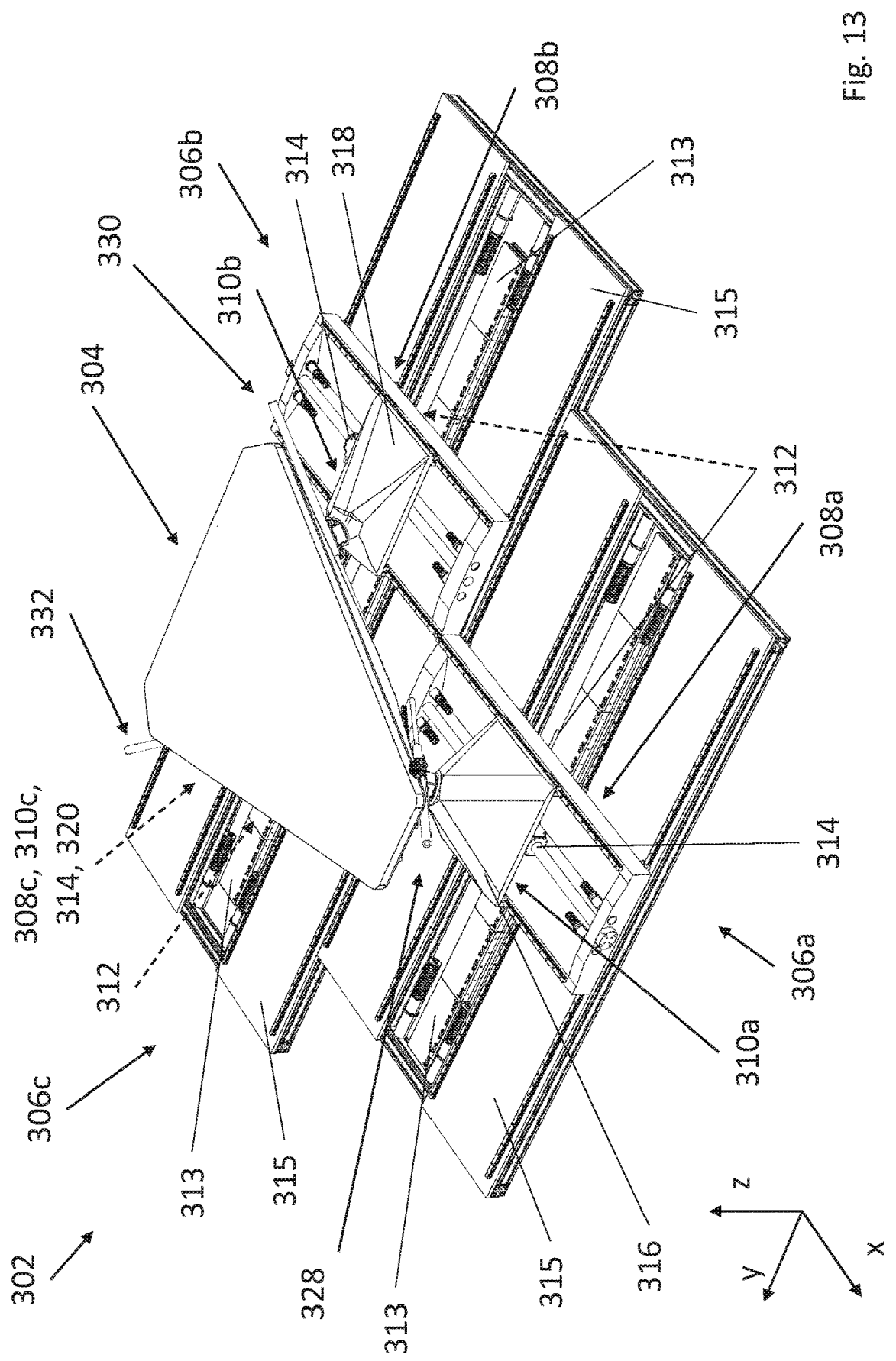
FIG. 13 is an isometric view of a motion platform in accordance with a further embodiment of the present invention.
Figure 14:
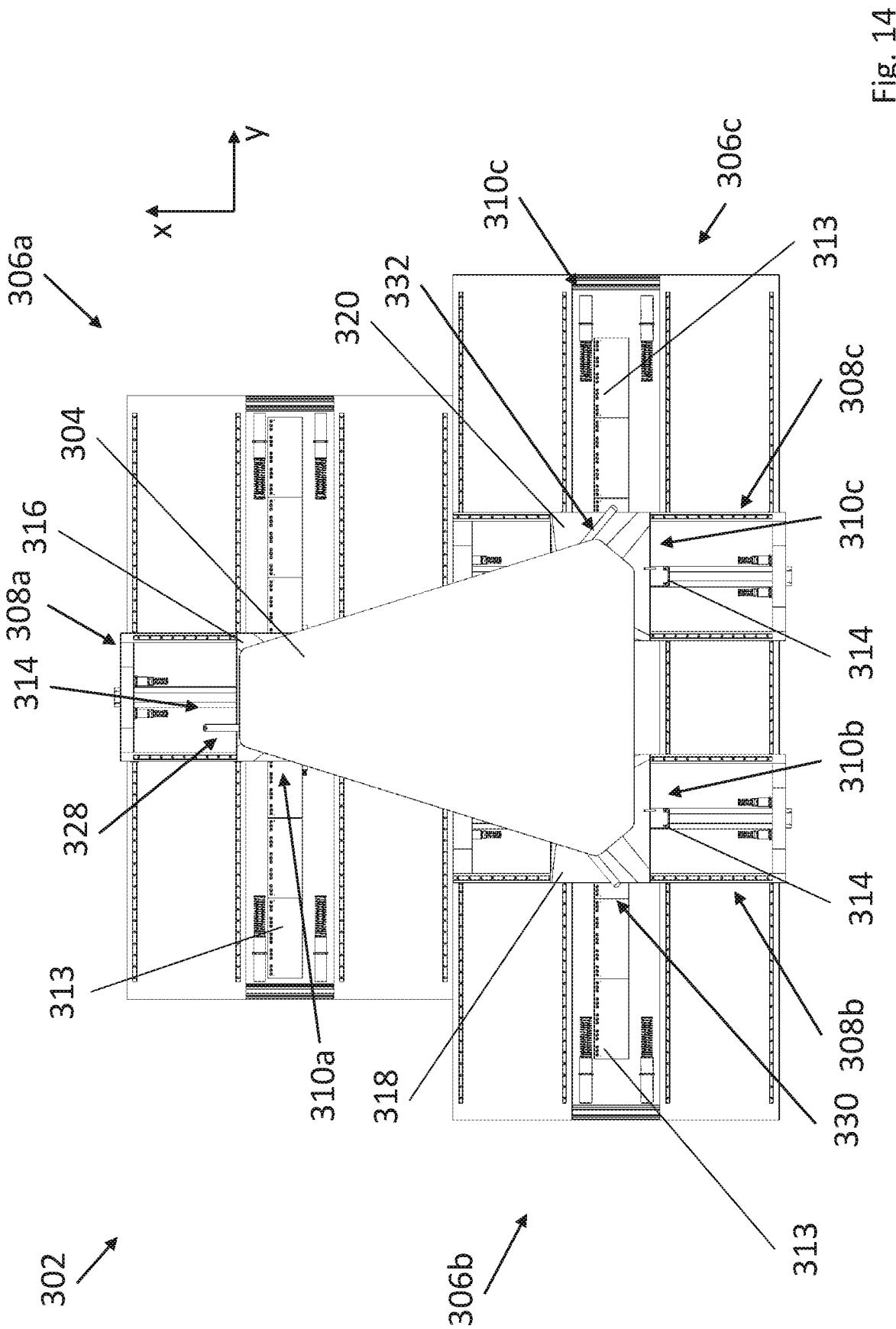
FIG. 14 is a plane view of the motion platform of FIG. 13.
Figure 15:
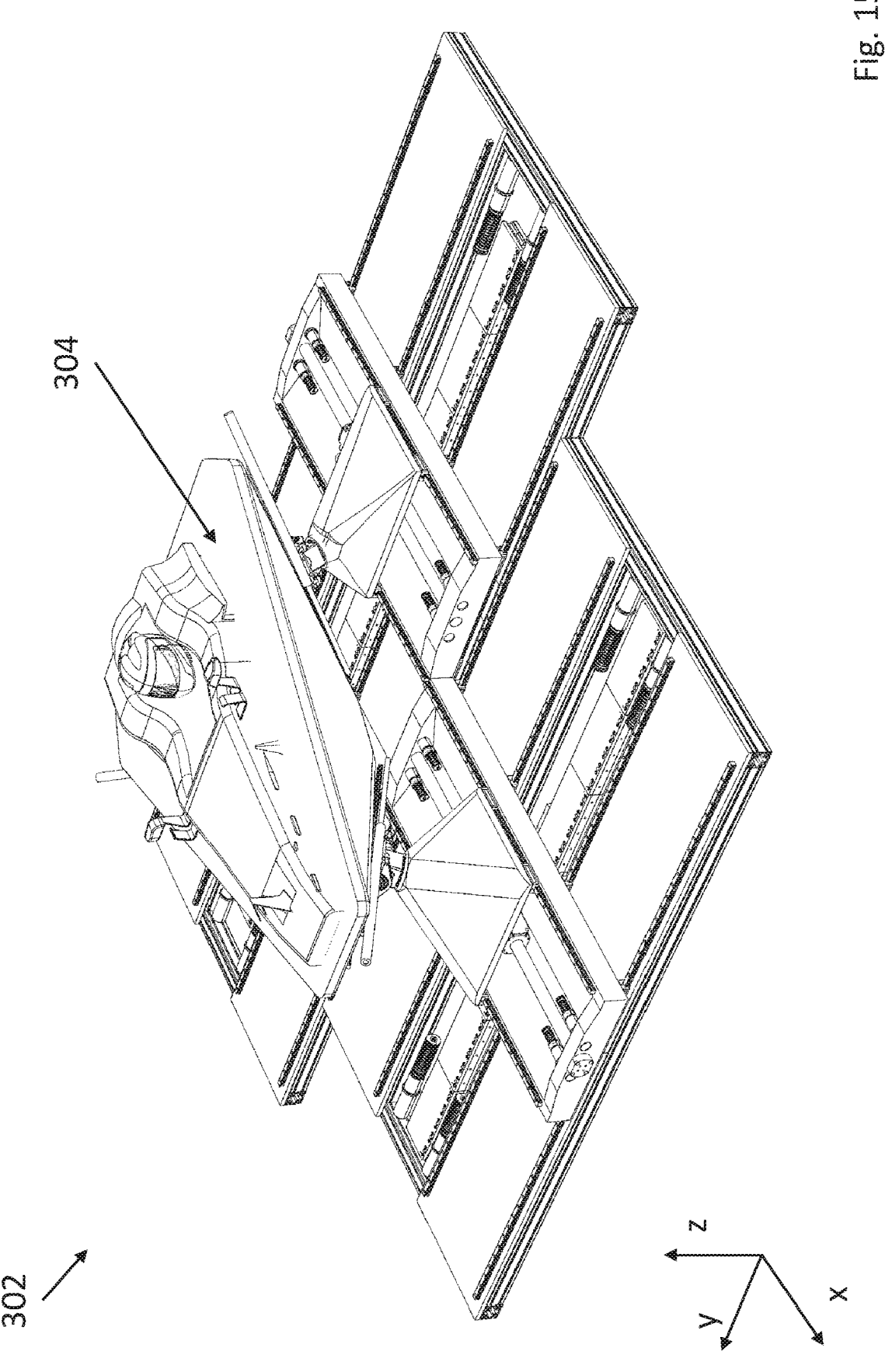
FIG. 15 is a further isometric view of the motion platform of FIG. 13 showing an integral chassis.

FIG. 13 is an isometric view of a motion platform 302 in accordance with a further embodiment of the present invention. Further views of the motion platform 302 can be seen in FIGS. 14 and 15. Specifically, FIG. 14 is a plane view of the motion platform 302, and FIG. 15 provides a further isometric view of the motion platform 302 showing the integral chassis used in the occupant carrier portion 304 (where this is simplified in FIGS. 13 and 14 for ease of illustration).

In this embodiment, the occupant carrier portion 304 is mounted to three X-Y tables 306*a-c* via respective pillars 316, 318, 320. However, in this embodiment, the pillars 316, 318, 320 are of a pyramid-shaped construction.

Figure 16:
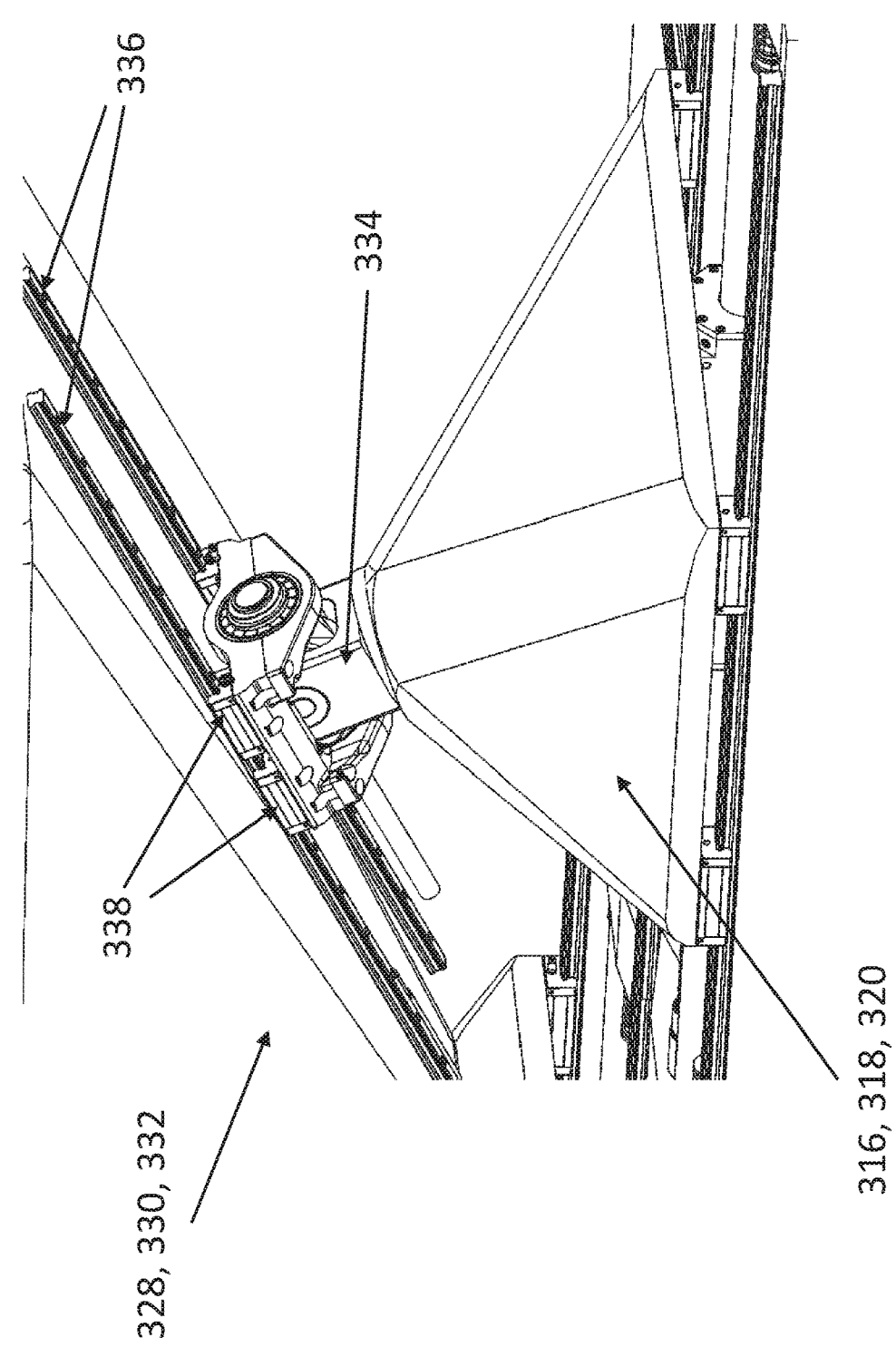
FIG. 16 is an isometric view of a guide portion employing a gimbal.

Each of the pillars 316, 318, 320 is connected to a respective guide portion 328, 330, 332 on the underside of the occupant carrier portion 304 via a gimbal 334, as can be seen more clearly in the close-up view of FIG. 16. The gimbal 334 is connected to a pair of bearing rails 336 on the guide portion 328, 330, 332 via bearings 338 positioned on the gimbal 334. These allow the gimbal 334 to slide along the bearing rails 336.

A further difference from the earlier-described embodiments is that, in the motion platform 302 of FIG. 13, the X-Y tables 306*a-c* are each constructed from stacked carriages, where the carriages 308*a-c* for motion in the y-direction are positioned at the bottom and the carriages 310*a-c* for motion in the x-direction are mounted on top of the y-carriages 308*a-c*. The carriages 308*a-c*, 310*a-c* are constructed from a composite material. Of course, other arrangements in which the x-carriage is at the bottom with the y-carriage on top could be used instead.

Figure 17:
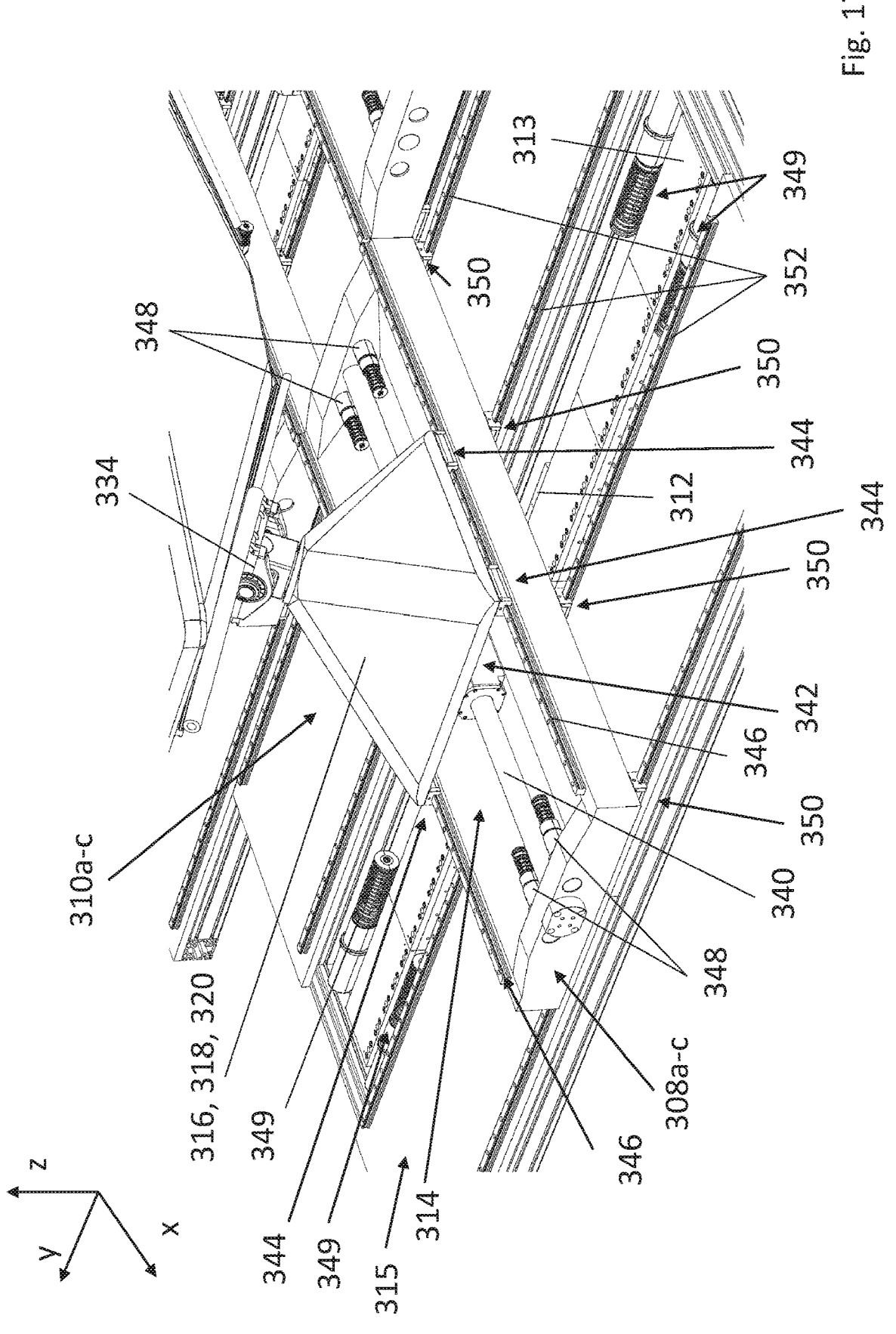
FIG. 17 is an isometric view of a stacked X-Y table base portion.

FIG. 17 provides a close-up view of a portion of the X-Y table, in which a closer view of the construction of the x-carriages 310*a-c* and y-carriages 308*a-c* can be seen.

The y-carriages 308*a-c* each include a respective linear motor 312. These 'U-channel' linear motors 312 of the y-carriages 308*a-c* run along a respective magnet way 313. Each y-carriages 308*a-c* has a number of bearings 350 on its underside that allows the y-carriage 308*a-c* to slide along bearing rails 352 on the base 315 under the respective y-carriage 308*a-c*.

The x-carriages 310*a-c* include the respective pillar 316, 318, 320. As the x-carriages 310*a-c* are mounted on top of the corresponding y-carriages 308*a-c*, motion of any given y-carriage 308*a-c* along the y-axis also causes the respective x-carriage 310*a-c*, and therefore the control pillar 316, 318, 320 thereof, to move along the y-axis.

The x-carriages 310*a-c* also include a number of bearings 344 that slide along a bearing rail 346 on the y-carriage 308*a-c* beneath. This allows the x-carriage 310*a-c*—and thus the pillars 316, 318, 320—to move along the x-axis, on top of the corresponding y-carriage 308*a-c*. The x-carriages 310*a-c* also include respective linear motors 314 that provide this motion along the x-axis.

The particular construction of the linear motors 314 used in the x-carriages 310*a-c* is discussed in detail below, however it will be appreciated that similar operational principles apply in respect of the U-channel linear motor of the y-carriages 308*a-c*.

Each of the linear motors 314 in the x-carriages 310*a-c* utilises a cylindrical stack of disk-shaped magnets surrounded by an electromagnet coil. These magnets form a shaft 340 that contains the disk-shaped magnets referred to above. Generally, the disk-shaped magnets are arranged such that like poles are next to one another, i.e. the orientation of the disk-shaped magnets alternates along the stack: N-S; S-N; N-S; etc. This shaft 340 is arranged to move through a forcer 342.

Thus the forcer 342 includes the electromagnet coil, where passing a current through the coil induces a magnetic field that results in the forcer 342 being pushed in the desired direction along the shaft 340.

An electrical current through the coil is controlled to cause a varying magnetic field from the coil that, due to the permanent magnetic field from the disk-shaped magnet stack, causes actuation of the forcer 342.

The forcer 342 is connected to the underside of the respective pillar 316, 318, 320. The pillars 316, 318, 320 have a number of bearings 344 that engage with bearing rails 346 that run along the x-carriage 310*a-c* in the x-direction. This allows the pillar 316, 318, 320 to move back-and-forth along the x-direction as the forcer 342 moves along the shaft 340.

Due to the fixed connection between the forcer 342 and the surrounding x-carriage 310*a-c* (in particular to the pillar

316, 318, 320), motion of the forcer 342 causes motion of the x-carriage 310*a-c* (and thus the corresponding pillar 316, 318, 320) along the x-direction as appropriate. Furthermore, as the pillar 316, 318, 320 is connected to the underside of the occupant carrier portion 304 (via the respective guide portion), movement of the forcer 342 causes movement of the occupant carrier portion 304 along the x-axis.

At each end of the travel of the x-carriage 310*a-c* within the y-carriage 308*a-c* are resilient bumpers 348 (in this case, coil springs), which 'cushion' motion at the end of the travel of the x-carriage 310*a-c*.

On the underside of the y-carriage 308*a-c* are several further bearings 350 that engage with bearing rails 352 on the respective base 315 that run along the length that the y-carriage 308*a-c* can travel (i.e. in the y-direction). The linear motor 312 of the y-carriage 308*a-c* provides motion using a forcer containing an electromagnet coil that runs along the magnet way 313, in a manner conventional to U-channel linear motors, known in the art per se. The linear motor 312 of the y-carriage 308*a-c* causes the y-carriage 310*a-c*, and therefore the x-carriage 310*a-c* mounted on it to move along the y-axis. Due to the connection between the pillars 316, 318, 320 and the occupant carrier portion 304, this also causes the occupant carrier portion 304 to move along the y-axis.

Similar to the bumpers 348 discussed above, at each end of the travel of the y-carriage 308*a-c* along the base 315 are resilient bumpers 349 (in this case, coil springs), which 'cushion' motion at the end of the travel of the y-carriage 308*a-c*.

Figure 18:
FIG. 18 is an isometric view of a motion platform with a yaw table stage in accordance with an embodiment of the present invention.
Figure 19A:
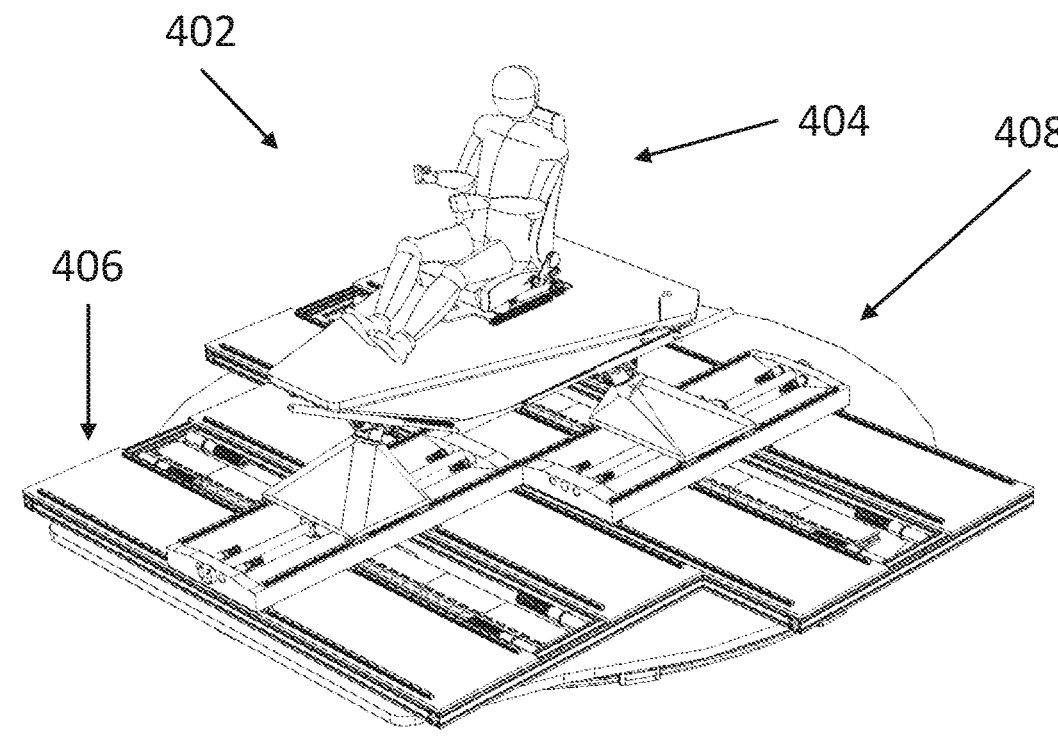
FIGS. 19A and 19B are further isometric views of the motion platform of FIG. 18.
Figure 19B:
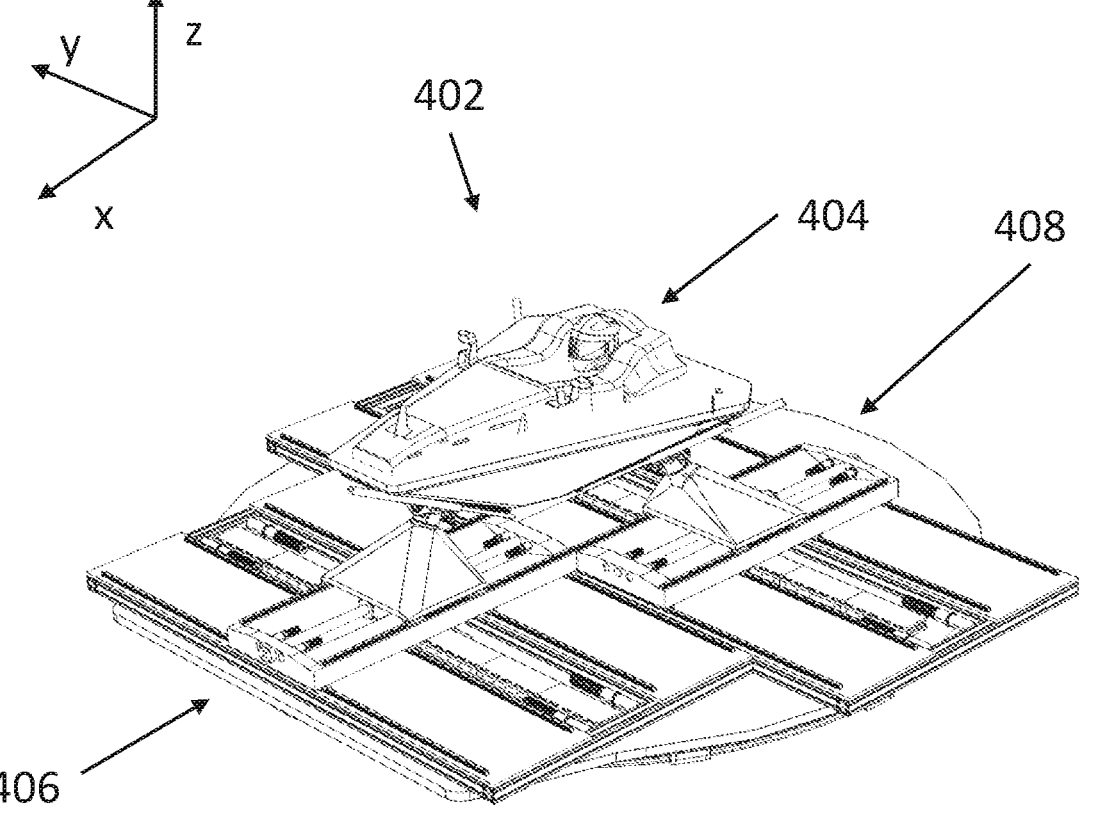
Figure 20:
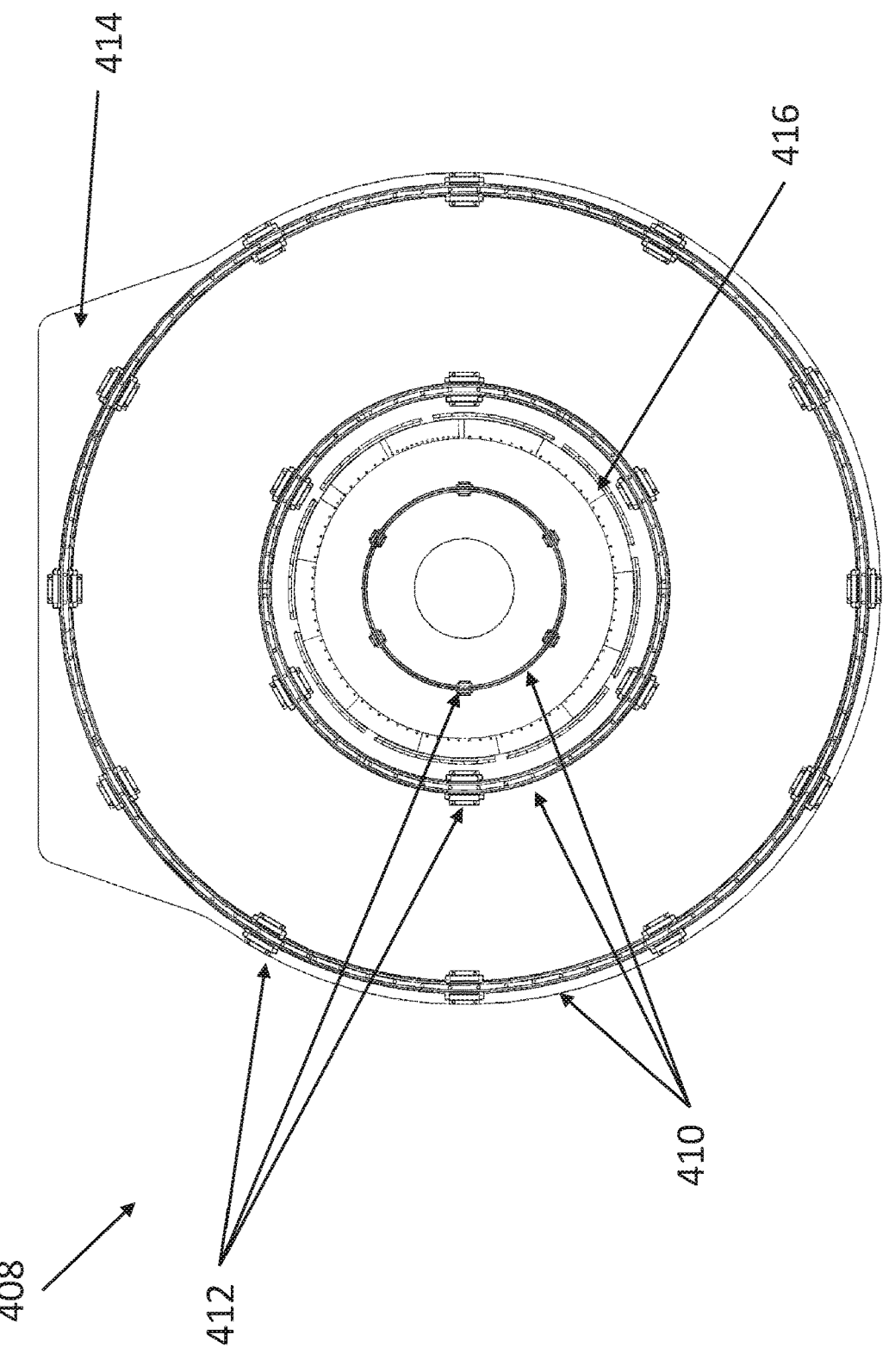
FIG. 20 is a plan view of the yaw table used in the motion platform of FIG. 18.

FIG. 18 is an isometric view of a motion platform 402 in which the occupant carrier portion 404 is mounted on a stacked base portion, in which an X-Y table stage 406 is positioned on top of a yaw table stage 408, in accordance with an embodiment of the present invention. FIGS. 19A and 19B are further isometric views of the motion platform of FIG. 18, showing cut-away views of the monocoque occupant carrier portion 404. FIG. 20 provides a plan view of the yaw table stage 408.

The 'primary' X-Y table stage 406 of the motion platform 402 is of the same construction, and works in the same way, as the arrangement described above with reference to FIGS. 13 to 17. However, rather than relying solely on the X-Y table stage 406 to provide yaw motion (i.e. rotation around the z-axis), the X-Y table stage 406 is mounted on the 'secondary' yaw table stage 408, that can provide unlimited yaw.

The yaw table stage 408 compliments the X-Y table stage 406 to ensure that yaw travel remains both highly dynamic and unlimited. As long as the yaw table stage 408 can accelerate to the maximum velocity within the time taken at the X-Y table stage 406 stage to reach its limit of rotation, there should be no degradation in performance when these stages 406, 408 are mounted on top of each other.

As can be seen in the plan view of FIG. 20, the yaw table stage 408 includes three concentric circular support rails 410, which act as bearing rails. The primary X-Y table stage 406 (omitted from view in FIG. 20) includes a number of bearing blocks 412, which are arranged to move around the circumference of the concentric rails 410. Only a select number of the bearing blocks 412 are labelled on FIG. 20 for ease of illustration These bearing blocks 412 are connected to the underside of a bed 414, which is positioned between the bearing blocks 412 and the X-Y table stage 406, such that the X-Y table stage 406 is mounted on the bed 414, and the bed 414 is mounted on the bearing blocks 412 of the yaw table stage 408. This structure could be made from steel or carbon or both.

The yaw table 408 includes a radial linear motor 416 that drives the rotational movement of the X-Y table stage 406 about the z-axis, i.e. to provide yaw motion, where the bearing blocks 412 slide over the rails 410 as the X-Y table stage 406 rotates. The forcer of the motor 416 is connected to the bed 414, while the stationary magnets of the motor 416 are connected to the base of the yaw table 408.

The number of bearing blocks 412 may be selected as a trade-off between stiffness and friction.

Thus it will be appreciated by those skilled in the art that embodiments of the present invention provide an improved motion platform having six degrees of freedom, where all motions are imparted through in-plane movement of the control pillars. The motion platform of the present invention may be readily scaled, e.g. in the surge direction, without requiring a substantial increase in the footprint of the motion platform. Furthermore, because out-of-plane motions are achieved only through in-plane movement of the control pillars, there is no need to stack layers of actuators, resulting in a lighter system that will typically exhibit an improved frequency response compared to conventional motion platforms.

While stacking layers of actuators is not required, this may still be beneficial while retaining the benefits of using fixed-height control pillars. By stacking the actuators as separate carriages, mounted one on top of another, the moving mass may be kept down when used with a large motion envelope.

While specific embodiments of the present invention have been described in detail, it will be appreciated by those skilled in the art that the embodiments described in detail are not limiting on the scope of the claimed invention.

The invention claimed is:

1. A motion platform comprising a base portion and an occupant carrier portion, said occupant carrier portion being linearly moveable along first, second, and third axes that are orthogonal to one another, and rotationally moveable about said first, second, and third axes, wherein:

the base portion comprises first, second, and third control pillars each extending substantially along the third axis, each of said control pillars being moveable, independently, in directions of the first and second axes in a plane defined by the first and second axes, wherein the control pillars are mechanically constrained such that they move only in said plane;

the base portion comprises an X-Y table portion, wherein the X-Y table portion is arranged to provide independent in-plane movement of the first, second, and third control pillars along a respective first direction and a respective second direction, said first and second directions defining a plane normal to the third axis;

the X-Y table portion comprises first, second, and third X-Y tables, each of said X-Y tables comprising respective first and second slide rails, said slide rails being slidably moveable relative to one another, wherein the first, second, and third control pillars are mounted on the first, second, and third X-Y tables respectively such that a sliding movement of the first slide rail moves the corresponding control pillar along the first direction and such that a sliding movement of the second slide rail moves the corresponding control pillar along the second direction, wherein each X-Y table respectively comprises a first carriage and a second carriage, said first and second carriages being arranged in a stack, the first carriage comprises the respective control pillar and one or more bearings that move along the first direction with respect to the second carriage, the first carriage comprises a first motor arranged to drive motion of the first carriage along the first direction, the second carriage comprises one or more bearings that move along the second direction with respect to a base of the X-Y table, the second carriage comprises a second motor arranged to drive motion of the second carriage along the second direction, the second carriage comprises one or more bearing rails aligned along the first direction, the bearings of the first carriage engage with the one or more bearing rails of the second carriage, the base of the X-Y table comprises one or more further bearing rails aligned along the second direction, and the bearings of the second carriage engage with the one or more bearing rails of the base;

the occupant carrier portion comprises first, second, and third guide portions, said first, second, and third guide portions being pivotally connected to the first, second, and third control pillars respectively by a respective coupling member;

the first, second, and third guide portions are each angled with respect to the plane defined by the first and second axes such that said guide portions are not parallel to said plane;

the first, second, and third guide portions are angled with respect to each other such that each guide portion is not parallel with the other guide portions;

the guide portions constrain motion of the respective coupling members therealong; and said motion platform is arranged such that, in use, the first, second, and third control pillars each have a respective height of a predetermined value along the third axis.

2. The motion platform as claimed in claim 1, wherein the first direction is along the first axis and/or the second direction is along the second axis.

3. The motion platform as claimed in claim 1, wherein the X-Y tables comprise one or more ironless linear motors.

4. The motion platform as claimed in claim 1, wherein the base portion comprises a substantially circular support rail that defines a plane normal to the third axis, wherein the first, second, and third control pillars are connected to a plurality of radially moveable actuators, each connection between the control pillars and the respective radially moveable actuators being provided by a respective tension member, wherein the radially moveable actuators are arranged to move around the circumference of the substantially circular support rail.

5. The motion platform as claimed in claim 1, wherein the guide portions are arranged such that:

the first guide portion is located at a central front portion of the occupant carrier portion;

the second guide portion is located at a rear-left portion of the occupant carrier portion; and the third guide portion is located at a rear-right portion of the occupant carrier portion.

6. The motion platform as claimed in claim 1, wherein the guide portions each comprise a guide rail that defines a track along which motion of the respective coupling member is constrained.

7. The motion platform as claimed in claim 1, wherein one or more of the guide portions comprises a resilient member.

8. The motion platform as claimed in claim 1, the guide portions having a layout wherein an angle between at least one guide portion and the plane defined by the first and second axes is between 10 degrees and 70 degrees.

9. The motion platform as claimed in claim 1, the guide portions having a layout wherein an angle between the first, second, and third guide portions is between 70 degrees and 150 degrees.

10. The motion platform as claimed in claim 9, wherein an angle between the second and third guide portions is approximately 100 degrees.

11. The motion platform as claimed in claim 1, wherein the base portion comprises:

a primary stage that includes the X-Y table portion; and a secondary stage comprising a substantially circular support rail, said support rail defining a plane normal to the third axis;

wherein the X-Y table portion is mounted to the support rail via a radially moveable bearing members arranged to move around a circumference of the substantially circular support rail; and wherein the secondary stage further comprises a radial motor arranged to drive rotational motion of the primary stage relative to the secondary stage.

12. The motion platform as claimed in claim 1, wherein movements of the control pillars in the directions of the first and second axes are converted through the respective coupling members, and respective guide portions having an angled layout, into out-of-plane motion in the direction of the third axis by means of positioning the control pillars so as to force the platform to move into a desired attitude.

13. The motion platform as claimed in claim 1, wherein the respective coupling members are movable along the respective guide portions to cause the occupant carrier portion to tilt.

\*    \*    \*    \*    \*